US011603067B2

(12) United States Patent
Akoma

(10) Patent No.: US 11,603,067 B2
(45) Date of Patent: *Mar. 14, 2023

(54) APPARATUS, SYSTEM AND METHOD FOR REPOSITIONING OCCUPANT IN A CRASH EVENT

(71) Applicant: SCHROTH SAFETY PRODUCTS LLC, Fort Lauderdale, FL (US)

(72) Inventor: Patrick Akoma, Fort Lauderdale, FL (US)

(73) Assignee: SCHROTH SAFETY PRODUCTS LLC, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,143

(22) Filed: Aug. 23, 2021

(65) Prior Publication Data

US 2021/0380064 A1  Dec. 9, 2021

Related U.S. Application Data

(63) Continuation of application No. 16/346,038, filed as application No. PCT/US2017/059312 on Oct. 31, 2017, now Pat. No. 11,124,145.

(60) Provisional application No. 62/553,089, filed on Aug. 31, 2017, provisional application No. 62/415,856, filed on Nov. 1, 2016.

(51) Int. Cl.
| | | |
|---|---|---|
| *B60R 21/207* | (2006.01) |
| *B60N 2/427* | (2006.01) |
| *B60R 21/0132* | (2006.01) |
| *B60R 21/233* | (2006.01) |
| *B60R 21/01* | (2006.01) |

(52) U.S. Cl.
CPC ........ *B60R 21/207* (2013.01); *B60N 2/42754* (2013.01); *B60R 21/0132* (2013.01); *B60R 21/233* (2013.01); *B60R 2021/01231* (2013.01)

(58) Field of Classification Search
CPC . B60R 21/207; B60R 21/0132; B60R 21/233; B60R 2021/01231; B60N 2/42754
See application file for complete search history.

(56) References Cited

U.S. PATENT DOCUMENTS 9,428,137 B2 *  8/2016  Lee .................... B60N 2/42718
2003/0067149 A1 *  4/2003  Gray ................. B60R 21/01526
                                                                  180/273
(Continued)

FOREIGN PATENT DOCUMENTS

GB        2323336 A  *  9/1998  ........... B60N 2/4221
WO   WO-2008001548 A1 *  1/2008  ......... B60N 2/42718
(Continued)

*Primary Examiner* — Paul N Dickson
*Assistant Examiner* — Kurtis Nielson
(74) *Attorney, Agent, or Firm* — Trueba & Suarez, PLLC; Roberto Suarez

(57) ABSTRACT

An airbag system for repositioning a seat occupant in a moving vehicle during a crash event includes: a first inflatable airbag disposed proximate to a front portion of a seat pan; a second inflatable airbag disposed proximate to a rear portion of the seat pan; and inflation control device controlling deployment of the first and second inflatable airbags. The inflation control device includes a programmable controller controlling inflation parameters of the first and second inflatable airbags to achieve a desired lift, subject to monument constraints.

16 Claims, 27 Drawing Sheets

(56) References Cited

U.S. PATENT DOCUMENTS

| | | | | |
|---|---|---|---|---|
| 2014/0361520 | A1* | 12/2014 | Hirako | B60N 2/42763 |
| | | | | 280/729 |
| 2015/0274110 | A1* | 10/2015 | Ishida | B60R 21/23138 |
| | | | | 280/729 |
| 2019/0299902 | A1* | 10/2019 | Nagasawa | B60N 2/002 |
| 2020/0039459 | A1* | 2/2020 | Tanaka | B60N 2/4221 |
| 2020/0108748 | A1* | 4/2020 | Sekizuka | B60R 22/023 |
| 2020/0148154 | A1* | 5/2020 | Lee | B60R 21/233 |
| 2020/0298984 | A1* | 9/2020 | Walker | B60R 21/207 |

FOREIGN PATENT DOCUMENTS

| | | | | |
|---|---|---|---|---|
| WO | WO-2015036527 A1 * | 3/2015 | | B60R 21/201 |
| WO | WO-2021111748 A1 * | 6/2021 | | |

* cited by examiner

APPARATUS, SYSTEM AND METHOD FOR REPOSITIONING OCCUPANT IN A CRASH EVENT

CROSS-REFERENCE TO RELATED APPLICATIONS

This application is a Continuation of, and claims priority to, currently pending U.S. application Ser. No. 16/346,038, filed on Apr. 29, 2019, which is a US National Stage Entry of PCT/2017/059312, which is a non-provisional of, and claims priority to, U.S. Provisional Application No. 62/415,856, filed on Nov. 1, 2016, and U.S. Provisional Application No. 62/553,089, filed on Aug. 31, 2017; all of which are incorporated by reference herein in their entirety.

TECHNICAL FIELD

This invention relates generally to the field of occupant restraint systems and, more specifically, to an apparatus, system, and related method for repositioning an occupant during a crash event.

BACKGROUND OF THE INVENTION

Similar to the safety regulations and requirements for most motor vehicles travelling along the highways and byways of the United States, inflatable airbag systems are required in most aircraft which traverse U.S. airways. Also, similar to the National Highway Safety Administration which issues and administers Federal Motor Vehicle Safety Standards ("FMVSS") regarding the manufacture of motor vehicles and equipment therein, the Federal Aviation Administration ("FAA") establishes standards for the regulation of aircraft and equipment utilized therein, including Federal Aviation Requirements ("FAR").

Restraint devices such as seatbelts maintain the seat occupant in a seated position during a crash event by restraining the occupant's lap, but do nothing to restrict the forward motion of the head and legs of the occupant during a crash event. This is a delimiting factor when positioning aircraft seating in relation to forward monuments, bulkheads, or other obstacles. Known airbag systems are positioned to cushion the impact of an imminent collision between the seat occupant and a fixed monument or structure, such as a steering wheel or dashboard. Some aircraft seat restraints feature seat belts with integrated airbags which deploy during a crash event, protecting the seat occupant from a collision with a monument, such as a bulkhead or the back of a seat. The problem with these airbag systems is that they add bulk to the seat restraints, thus making them difficult to use.

To address passenger safety issues, tests are conducted to measure head path excursion (HE) of an occupant's head during a crash event. HE is the distance between an initial position and a final, forward-most position of the passenger's head. Reducing HE is important in commercial aircraft, as the distance between rows of seats or the distance from the seat to a forward partition may be small. Known methods to reduce HE include seat belt pre-tensioners that limit HE by adjusting the tension of the seat restraint.

BRIEF SUMMARY OF THE INVENTION

According to an embodiment, an airbag system for repositioning a seat occupant in a moving vehicle during a crash event includes: a first inflatable airbag disposed proximate to a front portion of a seat pan; a second inflatable airbag disposed proximate to a rear portion of the seat pan; and inflation control device controlling deployment of the first and second inflatable airbags. The inflation control device includes a programmable controller controlling inflation parameters of the first and second inflatable airbags to achieve a desired lift, subject to monument constraints.

According to another embodiment, a method for repositioning a seat occupant during a crash event includes: disposing a first inflatable airbag proximate to a front portion of a seat pan; disposing a second inflatable airbag proximate to a rear portion of the seat pan; and using an inflation control device to control deployment of the first and second inflatable airbags to achieve a desired lift subject to monument constraints.

According to another embodiment, an airbag system for repositioning a seat occupant during a crash event includes: a multi-chamber inflatable airbag disposed along a seat pan; and an inflation control device controlling deployment of the multi-chamber airbag to achieve a desired lift subject to monument constraints.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 1-4 are time-lapsed illustrative views of the changes in body position of a test dummy during a crash event, wherein:

FIG. 1 is an illustrative side view of a test dummy seated in an aircraft seat prior to a crash event;

FIG. 2 is an illustrative side view of a test dummy at the onset of the crash event;

FIG. 3 is an illustrative side view of a test dummy during the crash event;

FIG. 4 is an illustrative side view of a test dummy during the crash event;

FIGS. 7-10 are time-lapsed illustrative views of the changes in body position of a test dummy during a crash event, wherein:

FIG. 7 is an illustrative side view of a test dummy seated in an aircraft seat fitted with a multi-chamber airbag;

FIG. 8 is an illustrative side view of a test dummy of a test dummy after inflation of a multi-chamber airbag during the crash event;

FIG. 9 is an illustrative side view of a test dummy after inflation of the multi-chamber airbag during the crash event;

FIG. 10 is an illustrative side view of a test dummy after inflation of a multi-chamber airbag during the crash event;

FIGS. 13-16 are time-lapsed illustrative views of the changes in body position of a test dummy during a crash event, wherein:

FIG. 13 is an illustrative side view of a test dummy seated in an aircraft seat fitted with two airbags;

FIG. 14 is an illustrative side view of a test dummy during the crash event;

FIG. 15 is an illustrative side view of a test dummy during the crash event;

FIG. 16 is an illustrative side view of a test dummy after full inflation of both airbags;

FIG. 17A and FIG. 17B are side-by-side illustrations of a test dummy at time t=t3, wherein:

FIG. 17A shows the test dummy at t3 with no seat airbags;

FIG. 17B shows the test dummy at t3 with seat airbags;

FIGS. 20-23 are time-lapsed illustrative views of the changes in body position of a test dummy during a crash event, wherein:

FIG. 20 is an illustrative side view of a test dummy seated in an aircraft seat fitted with a restrained seat cushion and two airbags;

FIG. 21 is an illustrative side view of the test dummy during the crash event;

FIG. 22 is an illustrative side view of a test dummy during the crash event;

FIG. 23 is an illustrative side view of a test dummy during the crash event;

DETAILED DESCRIPTION

Figure 1:
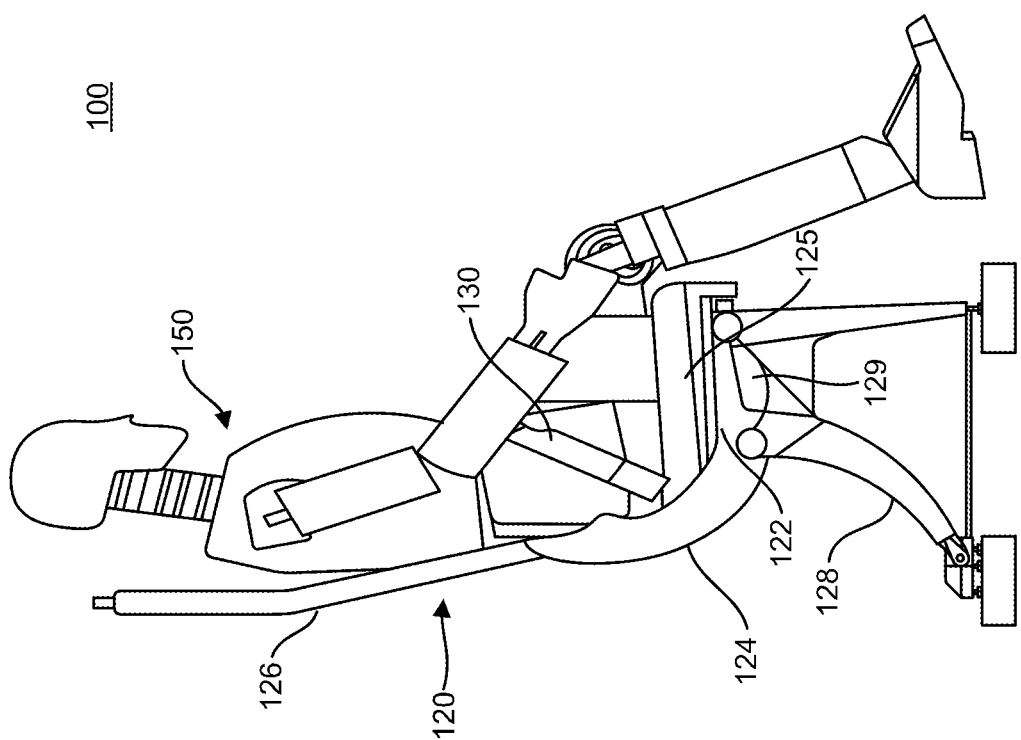

In this specification and in the appended claims and drawings, words and phrases have the meanings commonly attributed to them in the relevant art except as otherwise specified herein. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein. While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

Although the various embodiments of the present disclosure are shown and described within the context of a safety system for airplane passengers, one with ordinary skill in the art will appreciate and understand that the apparatuses, systems, and methods as described herein can also be advantageously applied in other types of moving vehicles, such as helicopters, automobiles, buses, carts, boats, and amusement park rides. It is to be understood that the embodiments as described are not limited to use with airplane seats. One with knowledge in the art will also understand that commonly used components associated with airbag assemblies are either not shown or not described in detail in order to avoid obscuring relevant aspects of the pertinent technology.

Embodiments of the present disclosure are directed toward an occupant safety apparatus that repositions the legs and torso of a seat occupant during a crash event. Such repositioning of the seat occupant can avoid or mitigate injury during the crash event. In addition, the reduction in forward travel caused by the repositioning allows a seat to be positioned closer to a forward monument, bulkhead, or other obstacle.

Referring now to the drawings, FIGS. 1-4 show time-lapsed views illustrating the body posture, position, and movement of a test dummy during a crash event. FIGS. 1-4 show four time-lapsed views of a crash test with a duration of approximately 150 milliseconds. Referring now to FIG. 1 in particular, there is shown a depiction of a standard aircraft passenger seat 120 equipped with a safety restraint in the form of a seat belt 130. Seated in the passenger seat 120 is a three-dimensional anthropomorphic test dummy 150 commonly used to test safety equipment on automobiles and aircraft. The anthropomorphic test dummy 150 is modeled to conform to standard human body shape, height, weight, body mass, flexibility, and center of gravity. The test dummy 150 is designed to reproduce the posture, flexibility, and movement of a seat occupant before, during, and after a crash event.

FIG. 1 shows a side view of a test dummy 150 (seat occupant) seated in an aircraft seat 120 before a crash event, at time t=0. One with knowledge in the art will appreciate that, although an aircraft seat is depicted here, the embodiments discussed herein can be advantageously applied to any seat in a moving vehicle, whether it is an aircraft, a car, a bus, boat, cart, or the like.

The aircraft seat 120 depicted in FIG. 1 is a non-limiting example of a seat that includes a seat pan 122 with a seat cushion 125 to provide comfort to the seat occupant, although not all aircraft seats have seat cushions. The seat 120 also includes a backrest 126 and seat legs 128. The curved area extending from the backrest 126 down to the bottom of the seat pan 122 is the lower back portion 124.

FIG. 1 illustrates a test dummy 150 positioned in a fully upright seat 120 with a restraint apparatus 130 engaged. The seat 120 can be mounted to the floor of a moving vehicle as shown in FIG. 1. The seat pan 122 is positioned substantially parallel to the floor and rests above the seat frame 129.

As used throughout this disclosure, a "crash event" is any sudden acceleration/deceleration, collision, impact, rollover, etc. of a moving vehicle. Generally, safety features for moving vehicles are designed to protect seat occupants from injuries sustained when the moving vehicle experiences a crash event. Restraint apparatuses such as seatbelts 130 are designed to keep the occupant in his/her seat during a crash event. Airbags are designed to mitigate injuries that may be sustained by the seat occupant forcefully contacting a part of the moving vehicle, such as the dashboard, during a crash event. Airbags can be programmed to sense sudden acceleration/deceleration events above a preset magnitude, such as, for example, a force nine times above the force of gravity, or "g-force." When an airbag sensor detects that an acceleration/deceleration event meets or exceeds the pre-set threshold of force, the airbag is deployed.

Figure 2:
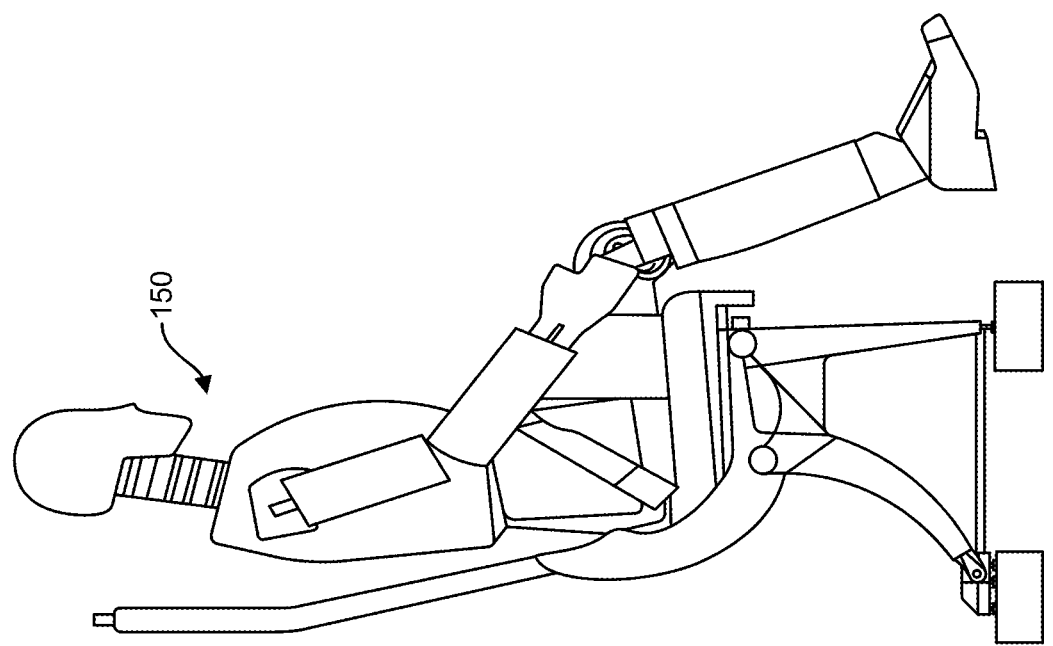

FIG. 2 shows a side view of the test dummy 150 of FIG. 1 at the onset of a crash event, at t=t1. FIG. 2 shows that the g-forces have begun to act on the test dummy 150 causing the test dummy's torso to move forward slightly and also causing the legs to rise.

Figure 3:
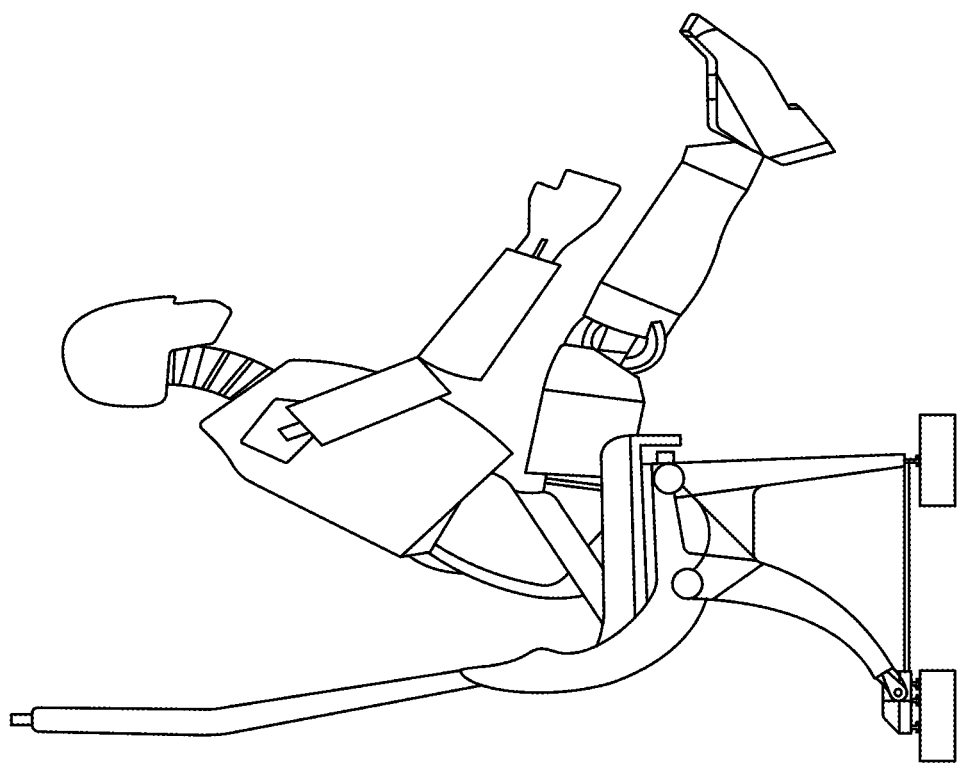

FIG. 3 shows how the test dummy's body is thrown forward at the next phase of the crash event, at t=t2. Note that the test dummy 150 has moved further forward and the legs have moved further up and forward.

Figure 4:
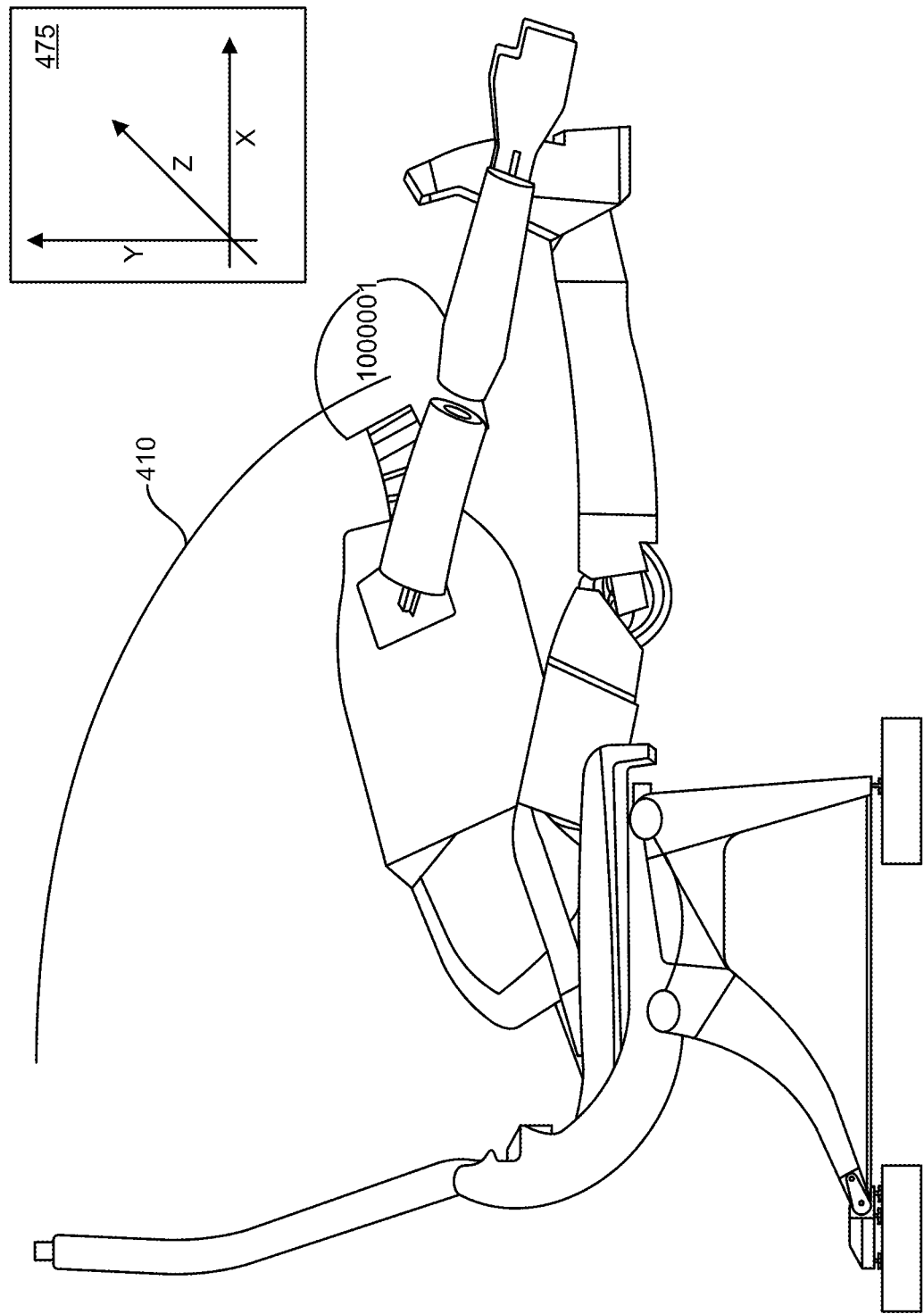

FIG. 4 shows the next phase of the crash event with the test dummy's head and torso now thrown completely forward, at t=t3, which is only approximately 150 milliseconds from the onset of the crash event. The test dummy 150 has now moved forward as far as the restraint apparatus 130 allows. At this point the test dummy's legs are fully extended. Arc 410 shows the path of travel (the HE) of the test dummy's head from the beginning of the crash event until the depicted fully extended position. The x, y, and z axes are depicted in graph 475.

Figure 5:
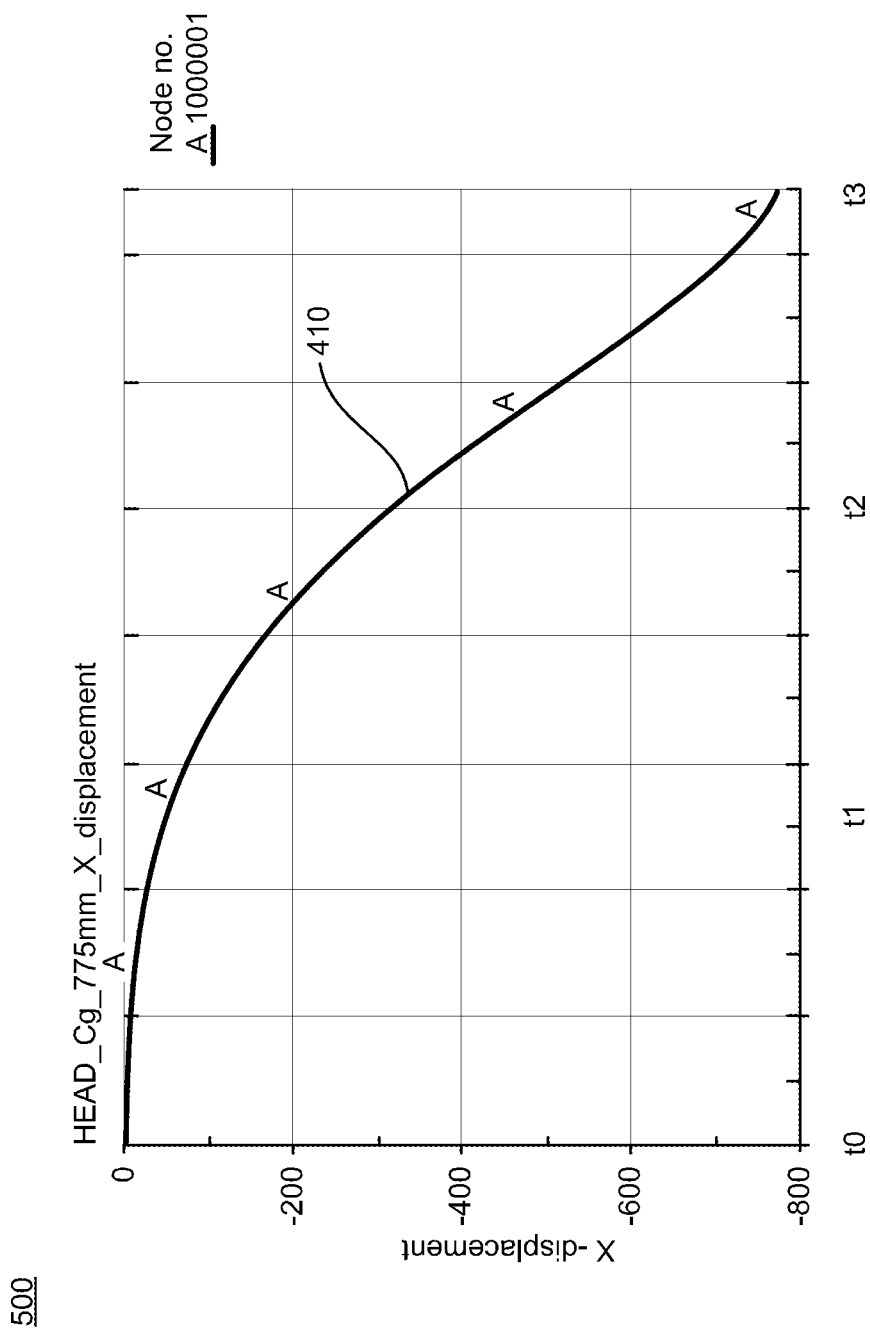
FIG. 5 is a graph illustrating head path excursion during the crash event.

FIG. 5 is an x-axis displacement chart 500 of the path of travel of the test dummy's head, the HE, during the crash event. The displacement of the test dummy's head along the x-axis is shown as arc 410. Note how the head moves forward from a displacement of 0 at time t0 (the beginning of the crash event) to an approximate displacement of 755 mm at time t3, indicating the test dummy's head has been thrown forward approximately 30 inches.

Figure 6:
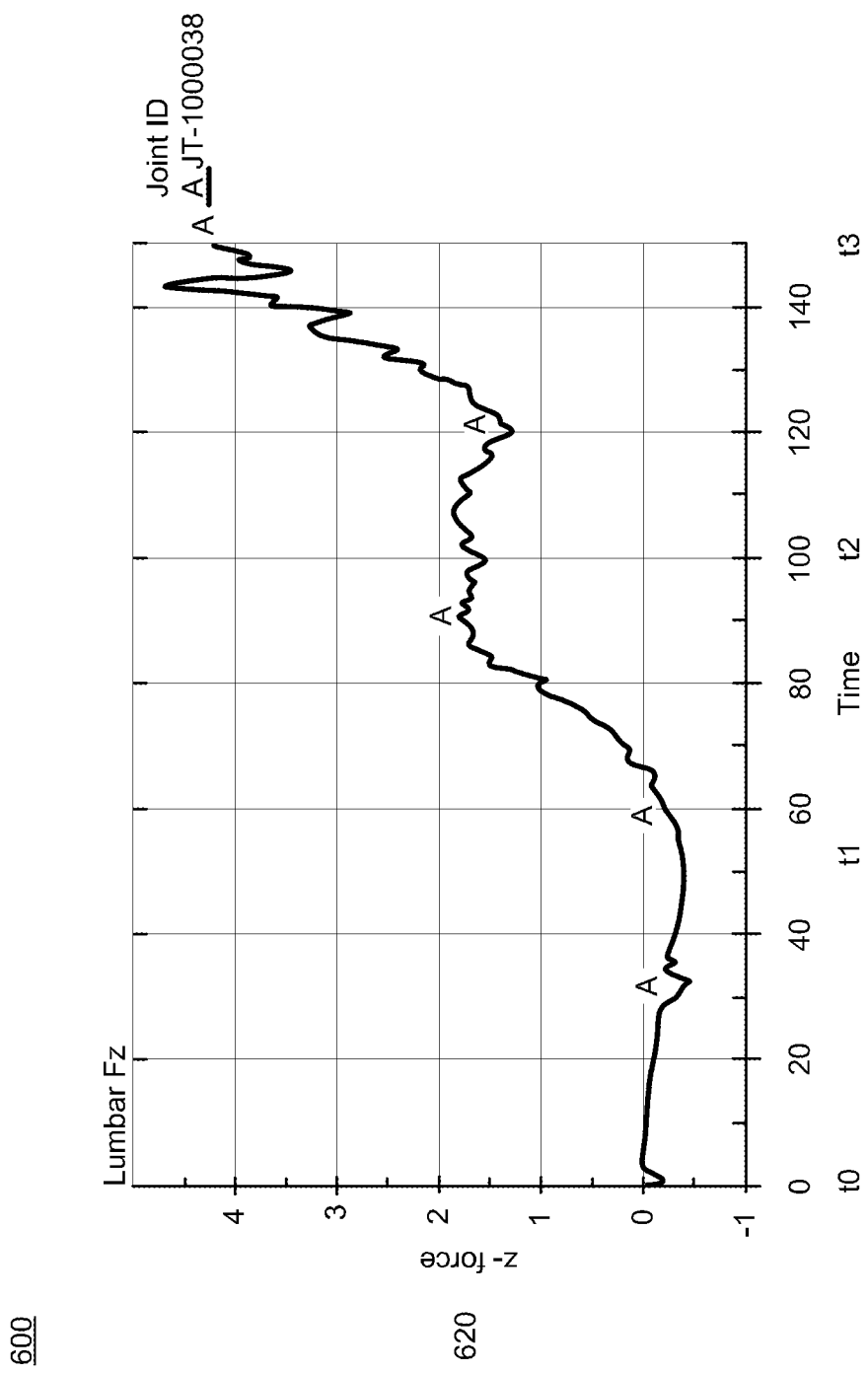
FIG. 6 is a graph illustrating the z-axis displacement of the lumbar region during the crash event.

FIG. 6 is the z-force chart 600 of the test dummy's lumbar area (lower spine) displacement during the crash event. Listed on the left-hand side of the chart 600 are the z-force displacement numbers from −1 through 4 representing the effect of the gravitational force (g-force) registered on the test dummy's lumbar area. The chart 600 indicates the z-axis displacement of the test dummy's lumbar area during the crash event.

FIGS. 7-10 are time-lapsed views illustrating the body posture, position, and movement of a test dummy 150 during a crash event. FIGS. 7-10 show four time-lapsed views of a crash test with an approximate duration of 150 milliseconds.

Figure 7:
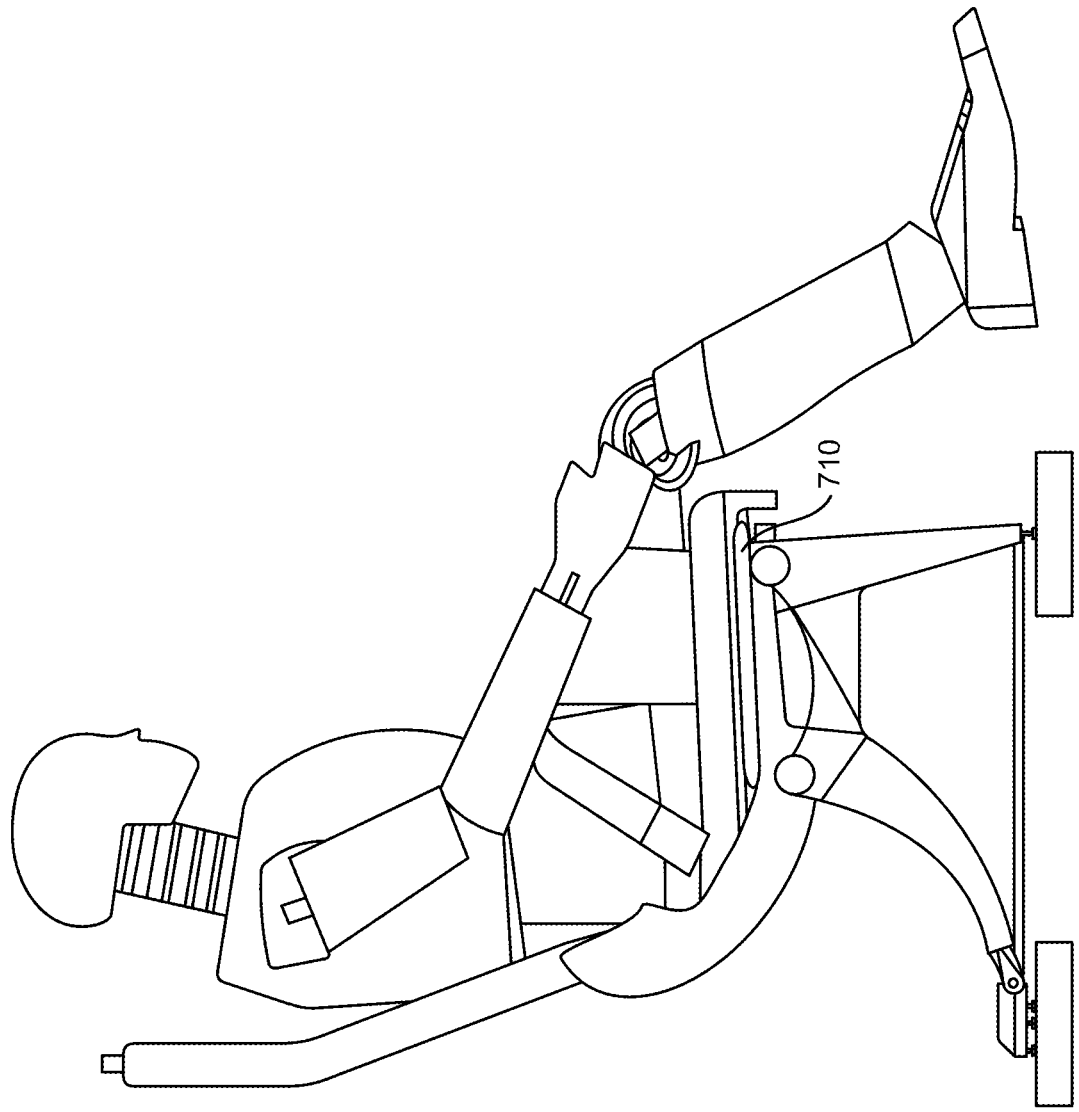

Referring now to FIG. 7, there is shown a side view of test dummy 150 seated in an aircraft seat 120 in which an embodiment of the present disclosure can be advantageously implemented. A multi-chamber airbag apparatus 710 is shown disposed under the seat pan 122, simply to illustrate the position of the airbag apparatus 710 with respect to a seat occupant. Normally, the airbag apparatus 710 is not visible while in the deflated state.

The airbag apparatus 710 can be attached to the seat pan 122, seat frame 129, or within the cushion 125 itself, so long as, when inflated, the airbag 710 lifts the seat occupant's knees and lower lumbar area. A single multi-chamber airbag apparatus 710 can be configured to inflate underneath the entire seat cushion 125 when deployed, thereby lifting the seat occupant's knees and lower lumbar area.

In one example, the airbag apparatus 710 includes inter alia an inflator, an airbag, and a bladder (not shown). As shown in FIG. 7, the airbag apparatus 710 is fixed to a vehicle seat 120 and configured so that the airbag portion, upon inflation, lifts the legs and lower back of a seat occupant, thereby tilting the seat occupant back towards the seat backrest 126. The result is that, by utilizing the invention disclosed herein, an increased level of occupant safety can be realized than without the use of such an apparatus. This is accomplished, mainly, because the temporary elevation of the legs, under the knees, initiates an early pre-tensioning of the occupant's lap belt 130, which is desirable. Further, the re-positioning of the occupant—tilted backwards—reduces the forward extent of the arc 410 of the head travel in a forward crash and, by definition, allows a seat to be positioned closer to a forward monument, bulkhead, or another obstacle.

Figure 8:
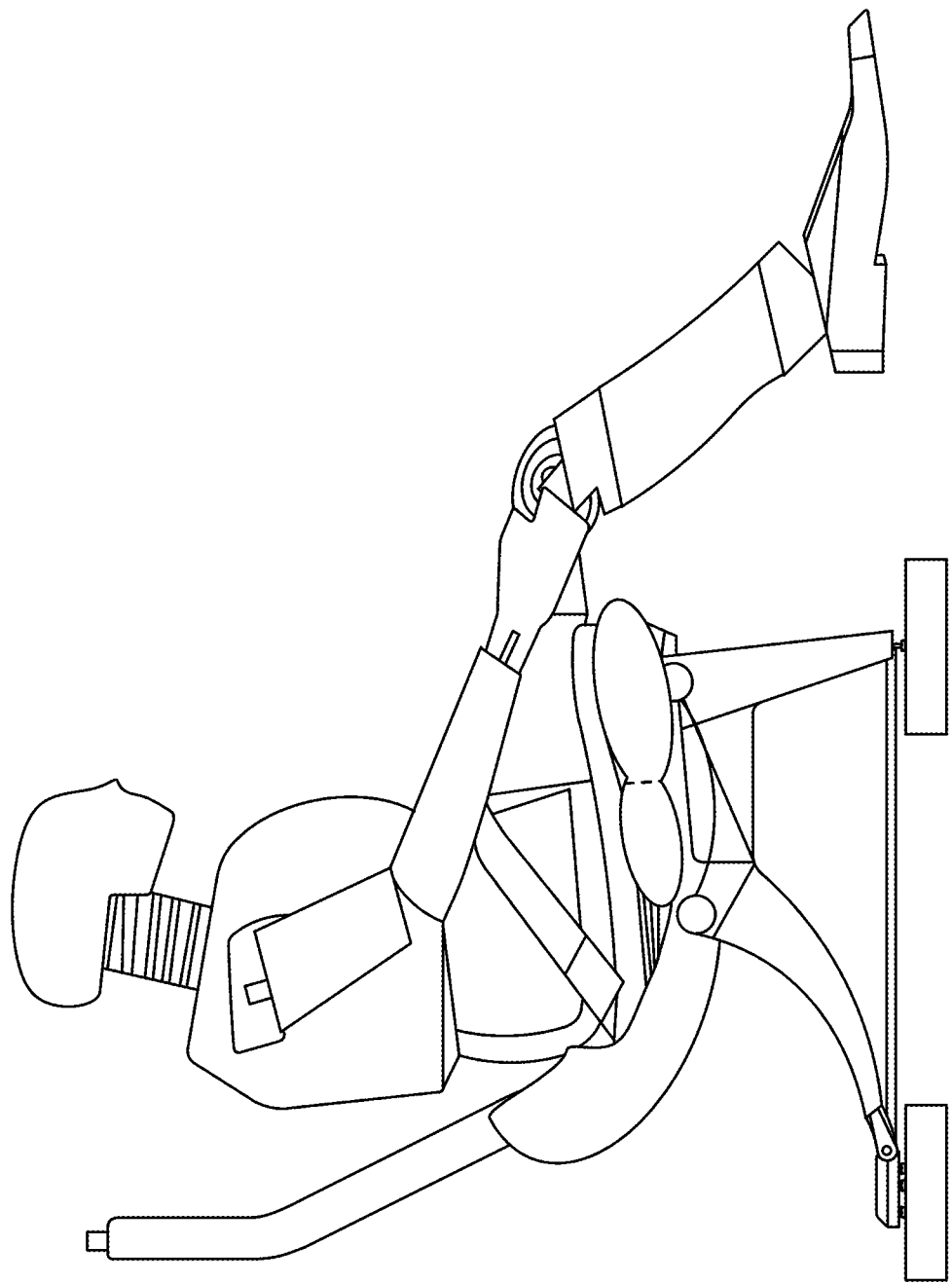

FIG. 8 shows a side view of the test dummy 150 of FIG. 7 at the onset of a crash event at t1, with the multi-chamber airbag 710 initially deployed. The g-forces have begun to act on the test dummy 150 causing the test dummy's torso to move forward slightly and also causing the legs to rise.

Figure 9:
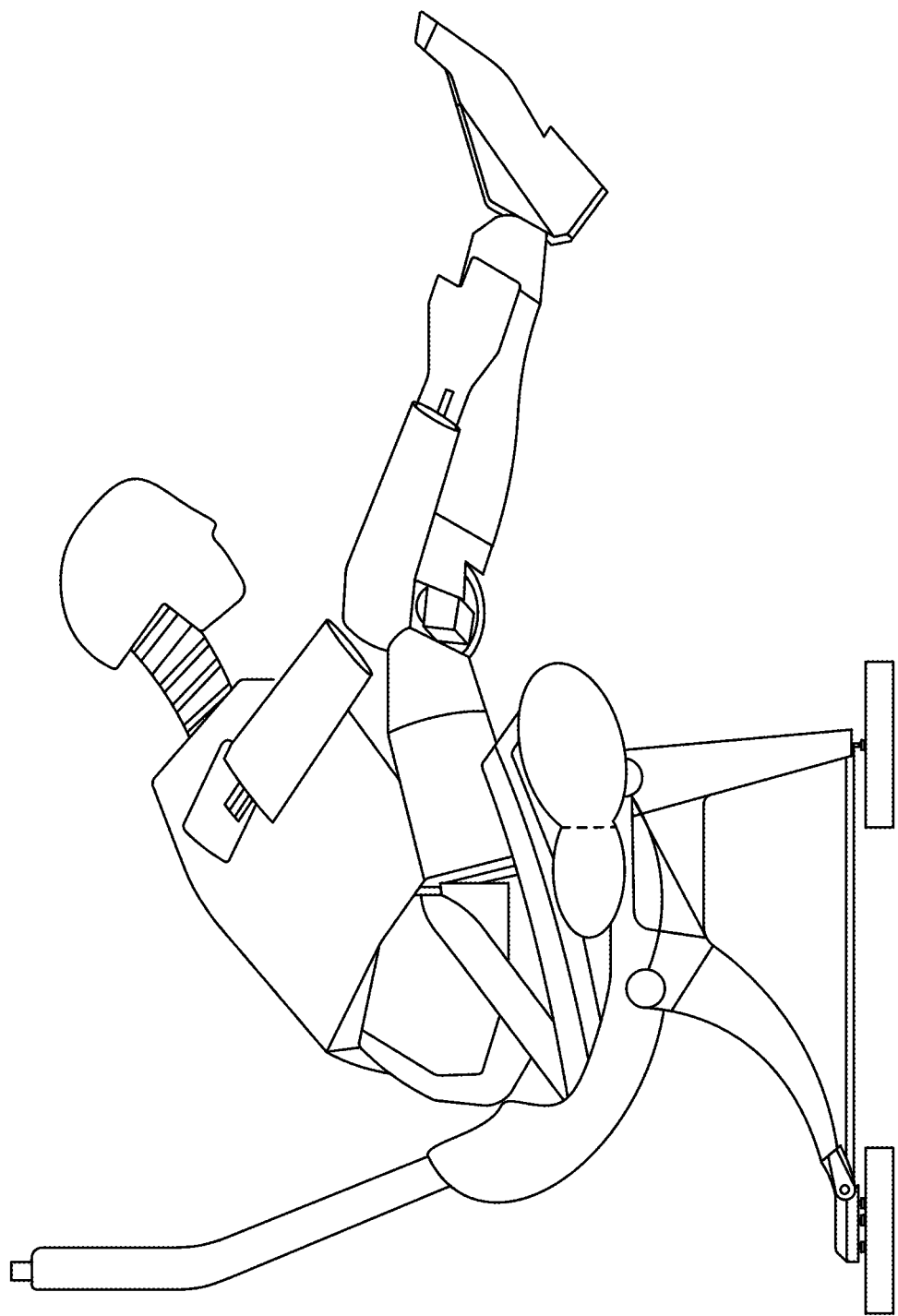

FIG. 9 shows how the test dummy's body is thrown forward at the next phase of the crash event, at t2. Note that the test dummy 150 has moved further forward and the legs have moved further up and forward, even though the elapsed time at this point is likely less than 80 milliseconds. The multi-chamber airbag 710 is fully deployed.

Figure 10:
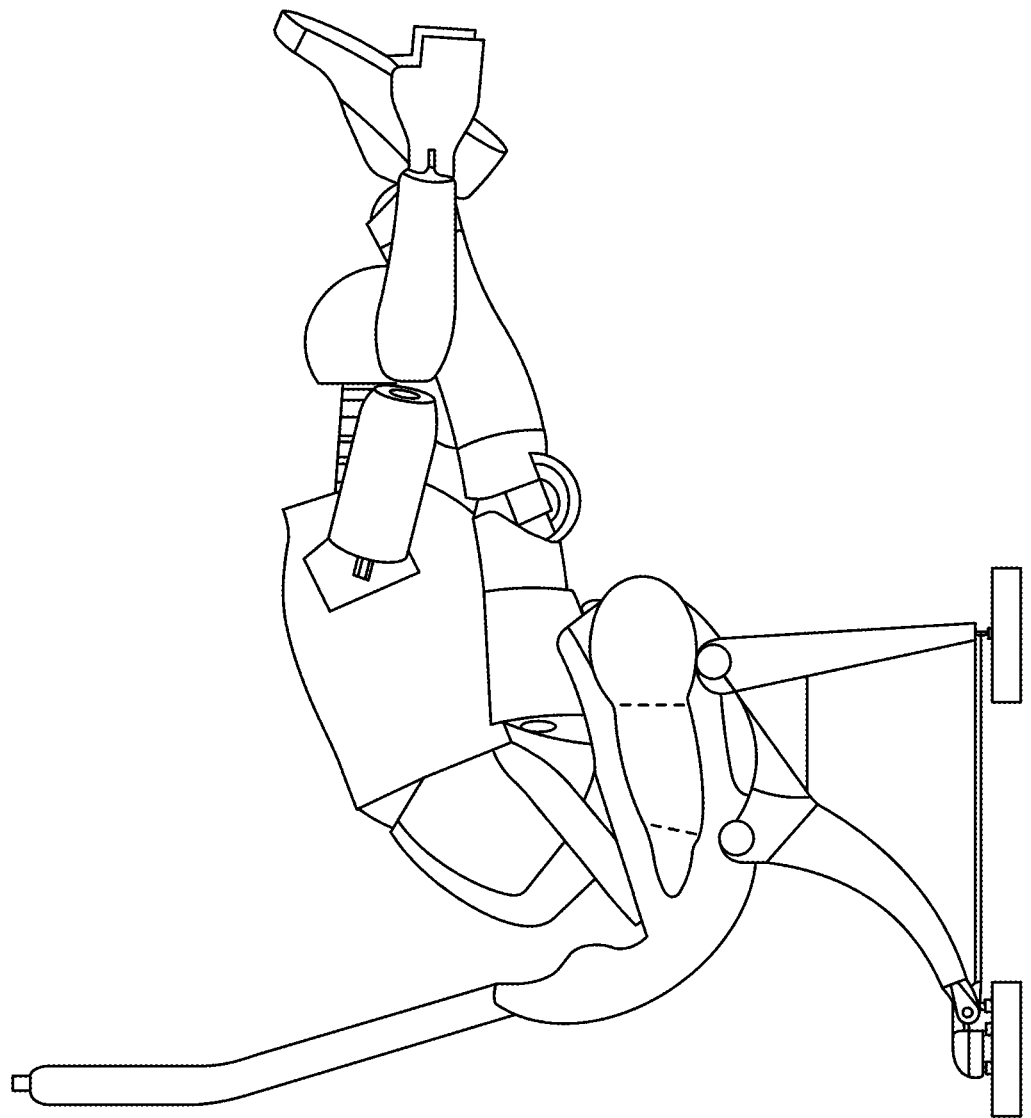

FIG. 10 shows the next phase of the crash event with the test dummy's head and torso now thrown completely forward at t3. The test dummy 150 has now moved forward as far as the restraint apparatus 130 allows. At this point the test dummy's legs are fully extended at approximately 150 milliseconds into the crash event. FIG. 10 shows an optional third chamber of the multi-chamber airbag 710 in the deployed state. One with knowledge in the art will appreciate that the multi-chamber airbag 710 can have two, three, or more airbags.

Figure 11:
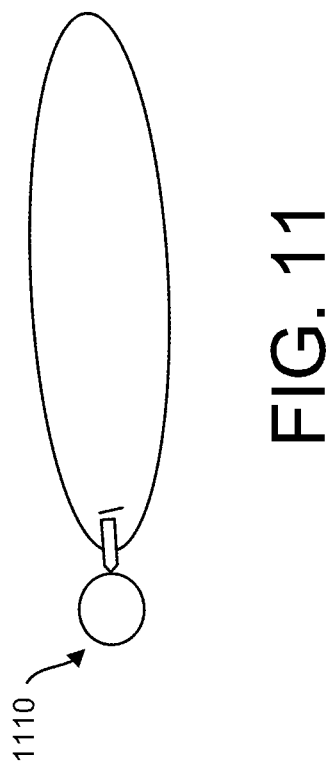
FIG. 11 is an bladder that can be used with an airbag.

FIG. 11 shows an example of a bladder 1110 used with an airbag. Bladder 1110 is operatively communicative with the airbag, in order to collect air, gas, or other substances that are "overflowed" from the airbag.

Figure 12:
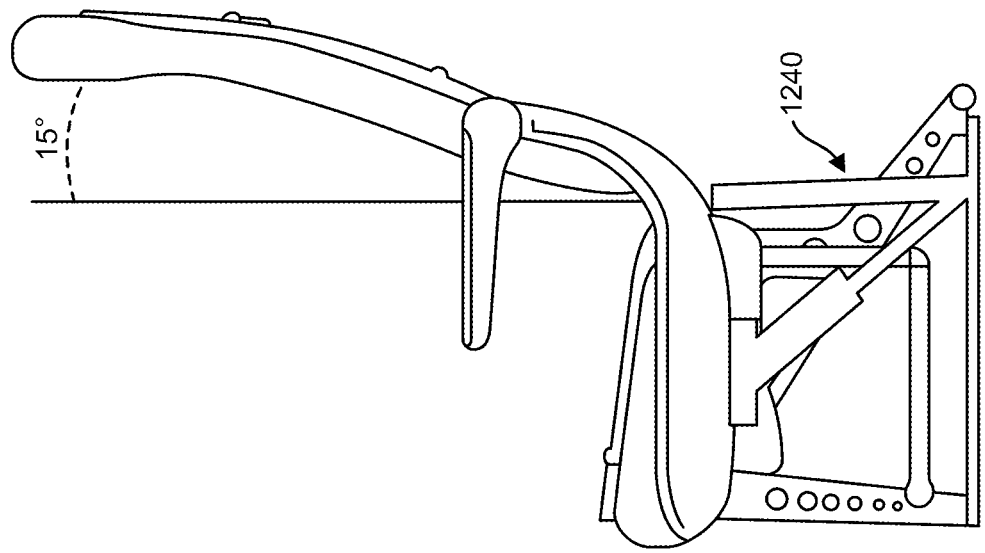
FIG. 12 shows a mechanical lift apparatus.

FIG. 12 shows one example of an optional mechanical lift 1240, such as a gas strut lift, piston, or a gas spring lift lifting the seat cushion. The benefit of using a mechanical lift 1240 is that it re-positions the seat occupant during a crash event. The mechanical lift can be, for example, a strut or gas spring.

Figure 13:
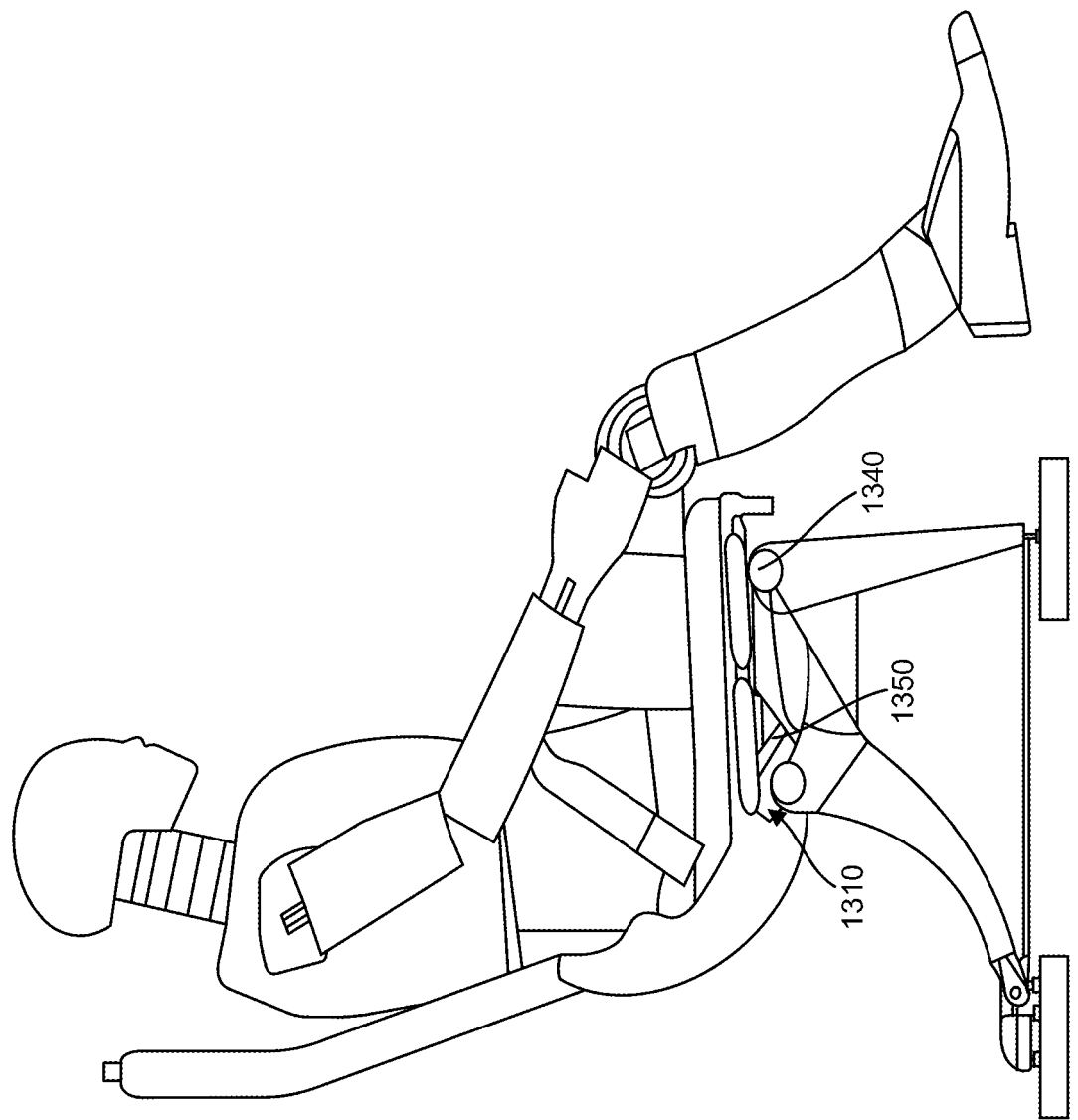

FIGS. 13-16 are time-lapsed views illustrating the body posture, position, and movement of a test dummy 150 during a crash event. Referring now to FIG. 13 in particular, there is shown a test dummy 150 at t=t0 seated in a fully upright aircraft seat 120 in which an embodiment of the present disclosure can be advantageously implemented. A multiple airbag apparatus 1310 is shown disposed under the seat pan 122 in a normally deflated condition, spaced from the seat occupant 150, to show its position with relation to the seat occupant's legs and torso. Normally, however, the multiple airbag apparatus 1310 is not easily visible while in the deflated state, as it will likely be disposed between the seat pan 122 and the seat frame 129.

The use of multiple airbags eliminates the need for a seatbelt pre-tensioner. Seat belt pre-tensionsers limit head excursion but cannot provide the lift to reposition a seat occupant higher along the z-axis. The use of multiple airbags provides the following advantages: the under-knee airbag arrests the forward motion of the seat occupant, while the lower lumbar airbag provides the upward motion to both pre-tension and additionally limit the forward motion.

Only two airbags are shown in FIG. 13; however three or more airbags can be positioned under the set pan 122. The airbags can be of different sizes and shapes. As an example, crash tests have been conducted with airbags having diameters of four, six, eight and ten inches, when inflated.

In one example, the multiple airbag apparatus 1310 includes multiple flexible airbags with an inflator (not shown), a front airbag 1340, a rear airbag 1350, and a bladder (not shown). The inflator includes a pressurized component forcing pressurized gas into the airbags to inflate the airbags. The multiple airbag apparatus 1310 also include a programmable crash detection device (not shown) in operative communication with the airbags. The crash detection device includes sensors that sense the changes in gravitation force that signal an impending crash event and initiate the inflation of the airbags. The crash detection device is programmable such that it controls the timing, sequence, amount, and duration of airbag inflation (inflation parameters). The order or sequence of inflation of the airbags can be adjusted according to the particular configuration of the aircraft seat 120 and its surrounding monuments, or structures. The timing of the inflation and the inflation amount is customizable in order to fine-tune the desired head arc 410 to fit a specific profile to avoid contact with surrounding monuments/structures. The crash detection device can also be programmed to alter at least one of its inflation parameters to accommodate occupant characteristics, such as height.

The multiple airbag apparatus 1320 may include multiple inflators, one for each airbag, or it can feature a manifold inflator to inflate multiple airbags. As shown in FIG. 13, the multiple airbag apparatus 1310 is fixed to a vehicle seat 120 and configured so that the airbag portion, upon inflation, lifts the lower lumbar region and the legs of a seat occupant, under the knees, thereby tilting the occupant back towards the seat backrest 126, while providing lift. The result is that, by utilizing the invention disclosed herein, an increased level of occupant safety can be reached than without the use of such an apparatus.

This is accomplished, mainly, because the temporary elevation of the legs, under the knees, along with the temporary elevation of the lower lumbar area, initiates an early pre-tensioning of the occupant's lapbelt, which is desirable. Raising the seat pan/seat cushion in this manner reduces torso bending and stops the head and neck movement sooner. Further, the re-positioning of the occupant—tilted backwards—reduces the forward extent of the arc 410 of the head travel in a forward crash and, by definition, allows a seat to be positioned closer to a forward monument, bulkhead, or another obstacle. The height of the "lift" depends on the size of the airbags and the amount of pressurized gas that they receive. Favorable test results have been reported with inflated airbag diameters of four, six, eight, and ten inches, but other diameters can also achieve desired results.

Figure 14:
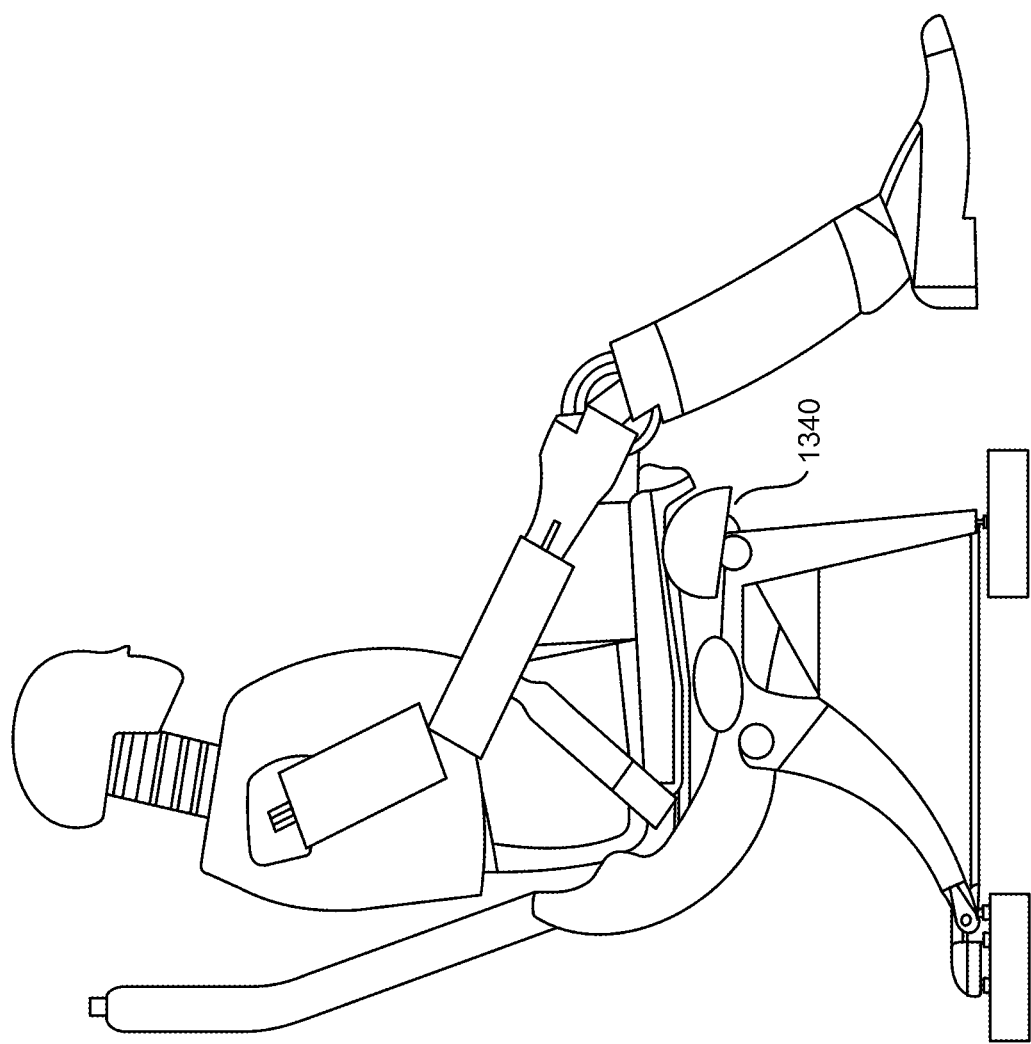

FIG. 14 shows a side view of the test dummy 150 of FIG. 13 at the onset of a crash event, at t=t1. As in the example of FIG. 8, the g-forces have begun to act on the test dummy 150 causing the test dummy's torso to move forward slightly and also causing the legs to rise. The rear airbag 1350 has deployed, resulting in a pre-tensioning of the seat belt 130. In addition, the front airbag 1340 has also deployed, repositioning the test dummy 150 so that the legs are lifted, causing the torso to move backwards towards the seat back 126.

Figure 15:
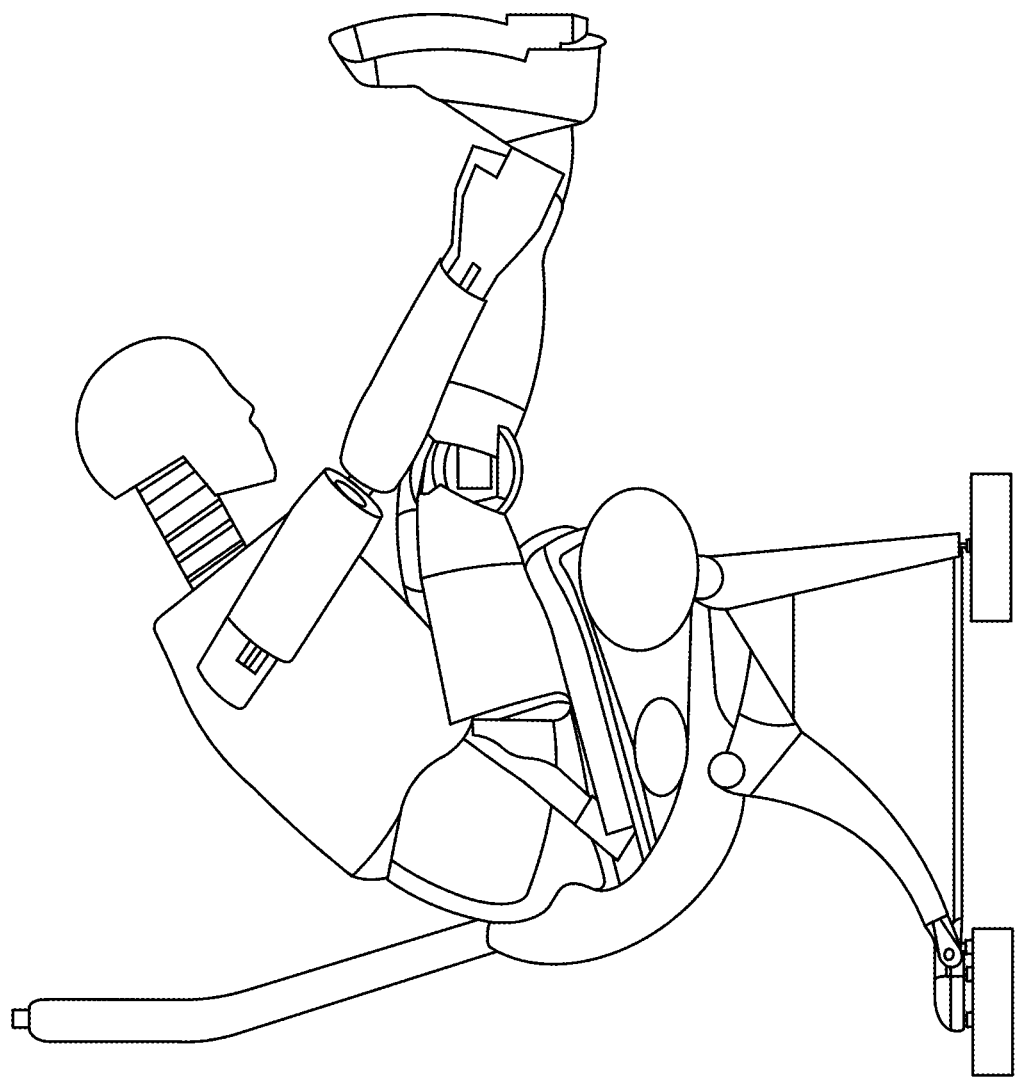

FIG. 15 shows a side view of the test dummy 150 of FIG. 13 at time t=t2. At this point in the crash event, both airbags are fully deployed, providing a further lift to the seat pan 122, thus enabling the lower back of the test dummy 150 to maintain contact with the seat back 126.

Figure 16:
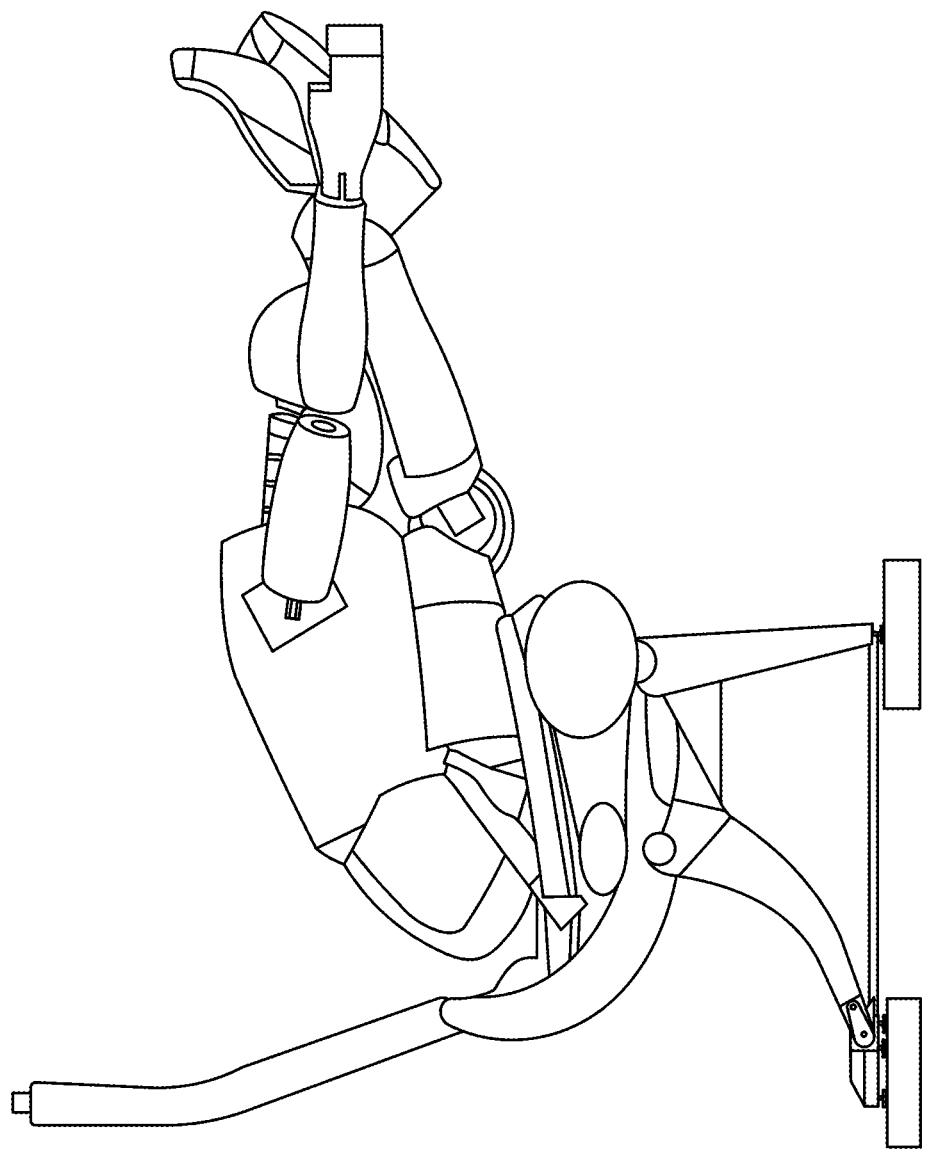

FIG. 16 shows a side view of the test dummy of FIG. 13 at time t=t3. Both airbags are fully deployed and the test dummy 150 has been propelled as far forward as the seat belt 130 allows.

Figure 17B:
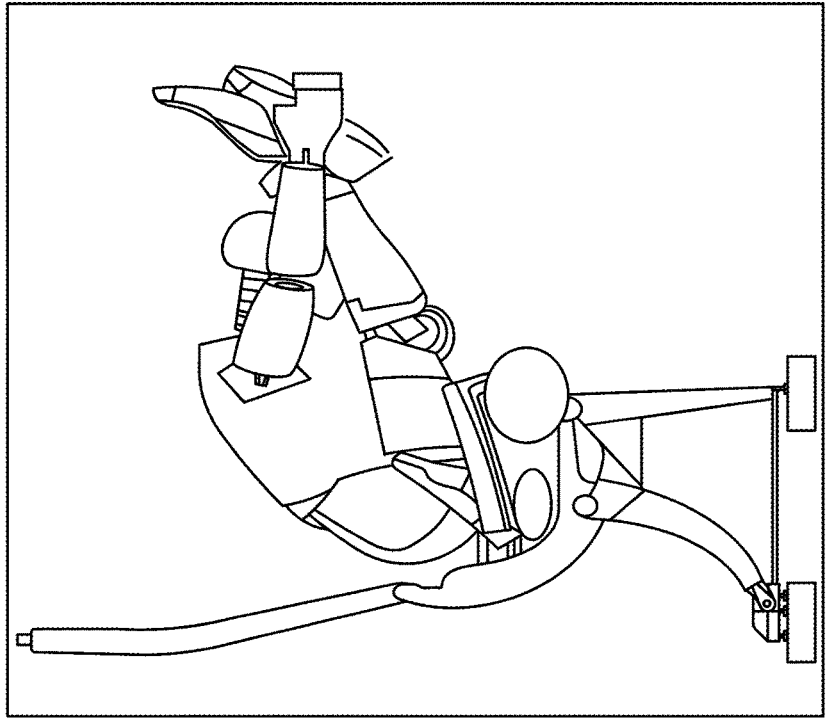
Figure 17A:
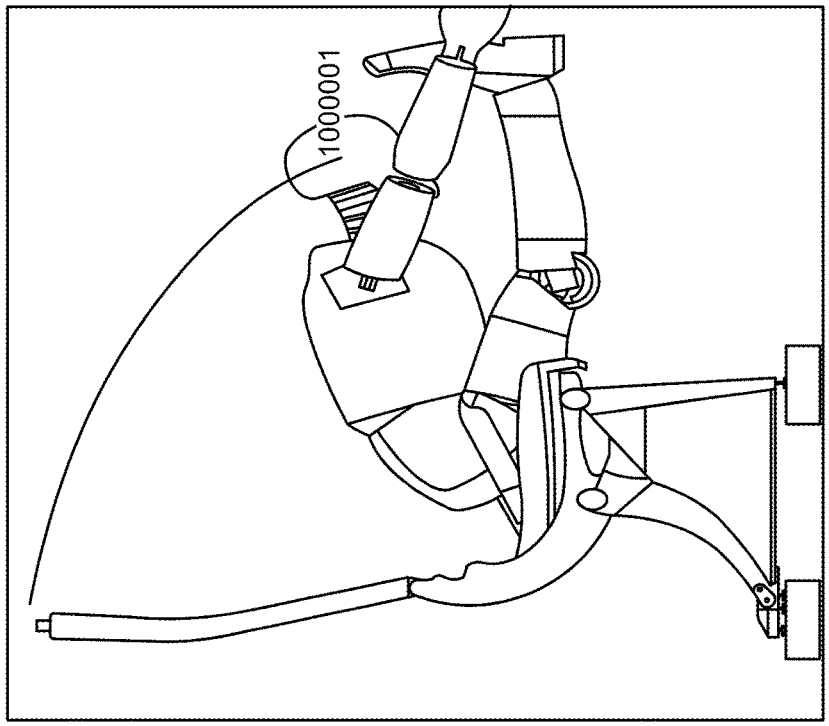

Turning now to FIG. 17A and FIG. 17B there is shown a side-by-side comparison of the body position of the test dummy 150 at t3. FIG. 17A shows the test dummy at t3 without a seat airbag, while FIG. 17B shows the test dummy 150 at t3 with seat airbag 1320 deployed. Comparing the position of the test dummy 150 of FIG. 17A with the position of the test dummy 150 of FIG. 17B at t3, it becomes immediately apparent that the deployment of the airbags 1340 and 1350 as shown in FIG. 17B drastically reduce the arc of the head displacement of the test dummy 150. In addition, the angled lifting of the seat pan 122 in FIG. 17B serves to reposition the torso to remain closer to the seat back 126, thus shortening the forward displacement of the legs.

Figure 18:
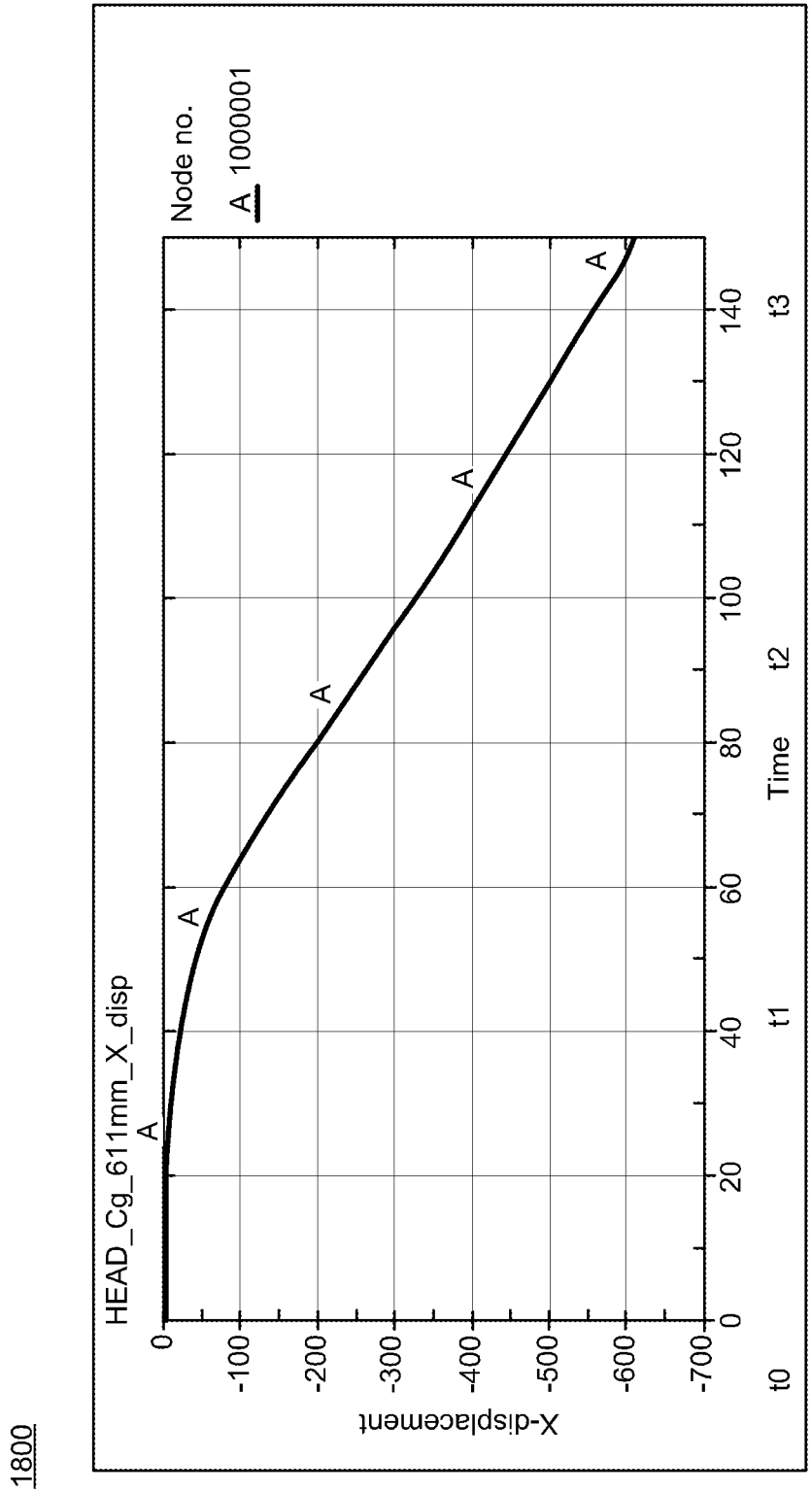
FIG. 18 is a graph illustrating head path excursion of the test dummy of FIG. 13 along the x-axis during the crash event.

FIG. 18 shows the x-axis displacement chart 1800 of the path of travel of the test dummy's head during the crash event shown in FIG. 13 through FIG. 16. Note that the HE has been reduced from 755 mm (without an airbag) to 611 mm.

Figure 19:
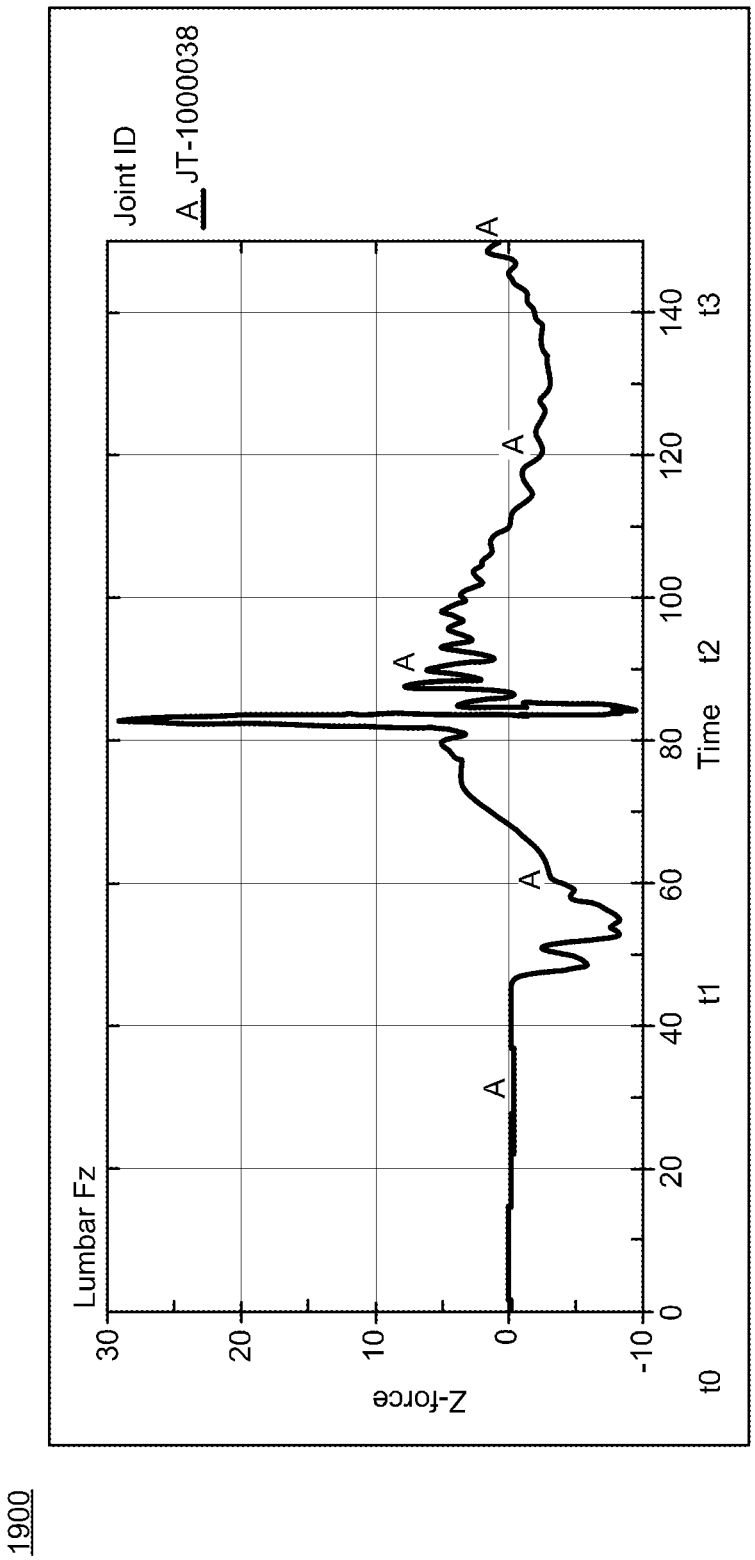
FIG. 19 is a graph illustrating the z-axis displacement of the lumbar region of the test dummy of FIG. 13 during the crash event.

FIG. 19 shows the z-force chart 1900 of the test dummy's lumbar area during the crash event shown in FIG. 13 through FIG. 16.

Figure 20:
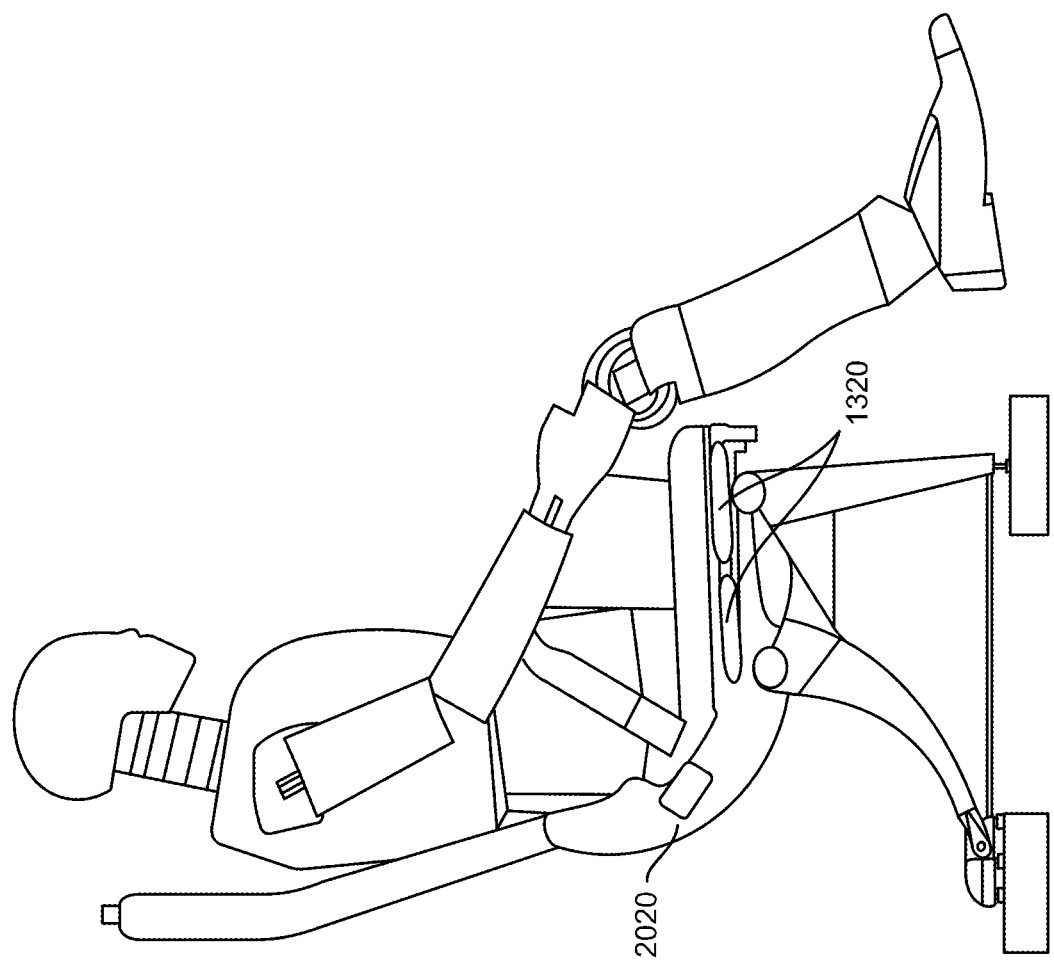

FIGS. 20-23 are time-lapsed views illustrating the body posture, position, and movement of a test dummy 150 during a crash event. Referring now to FIG. 20 in particular, there is shown an illustrative side view of test dummy 150 at t=t0 seated in a fully upright aircraft seat 120 in which an embodiment of the present disclosure can be advantageously implemented. A multiple airbag apparatus 1310 is shown disposed under the seat pan 122, simply to illustrate the position of the multiple airbag apparatus 1310 with respect to a seat occupant. Normally, the multiple airbag apparatus 1310 is not visible while in the deflated state.

Figure 21:
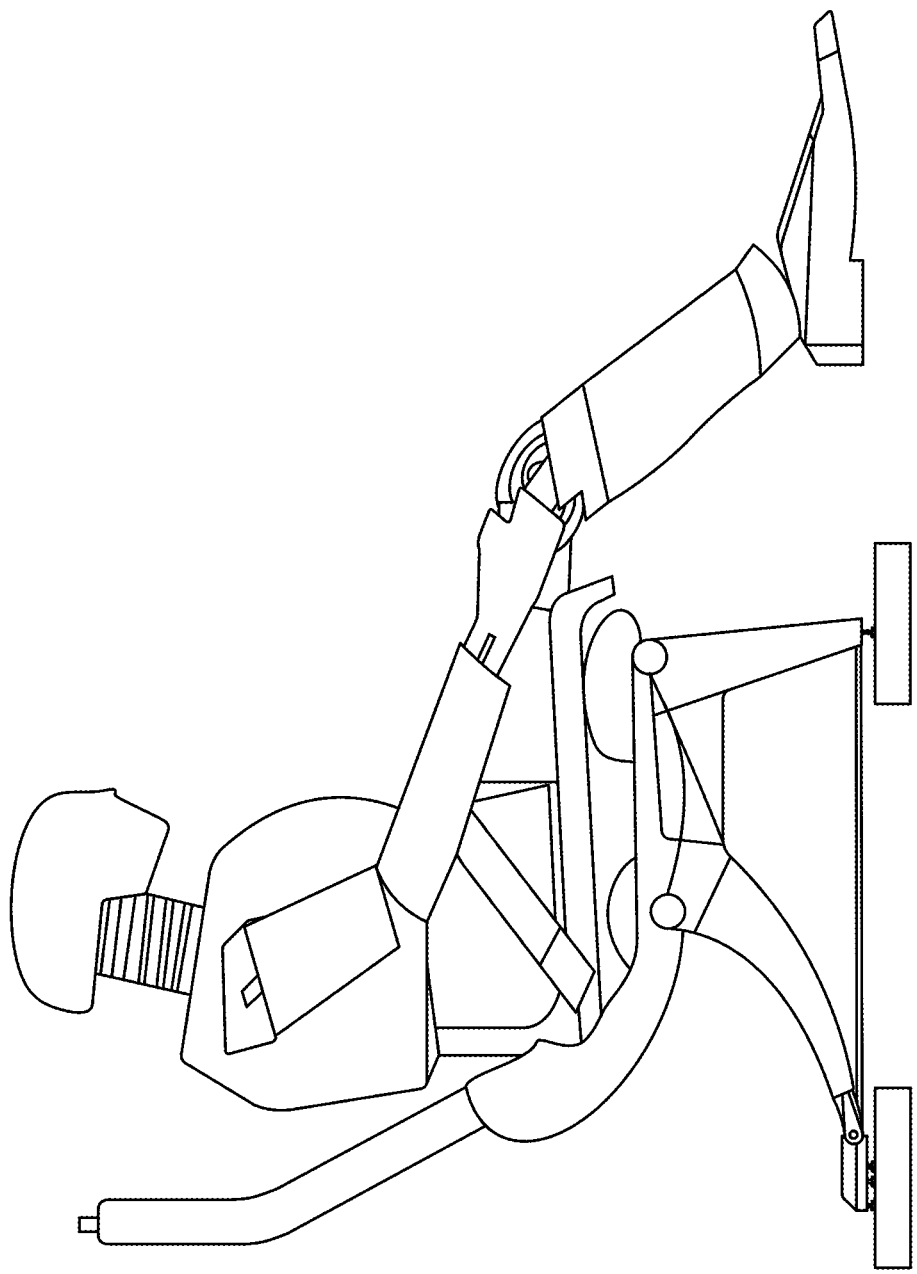
Figure 22:
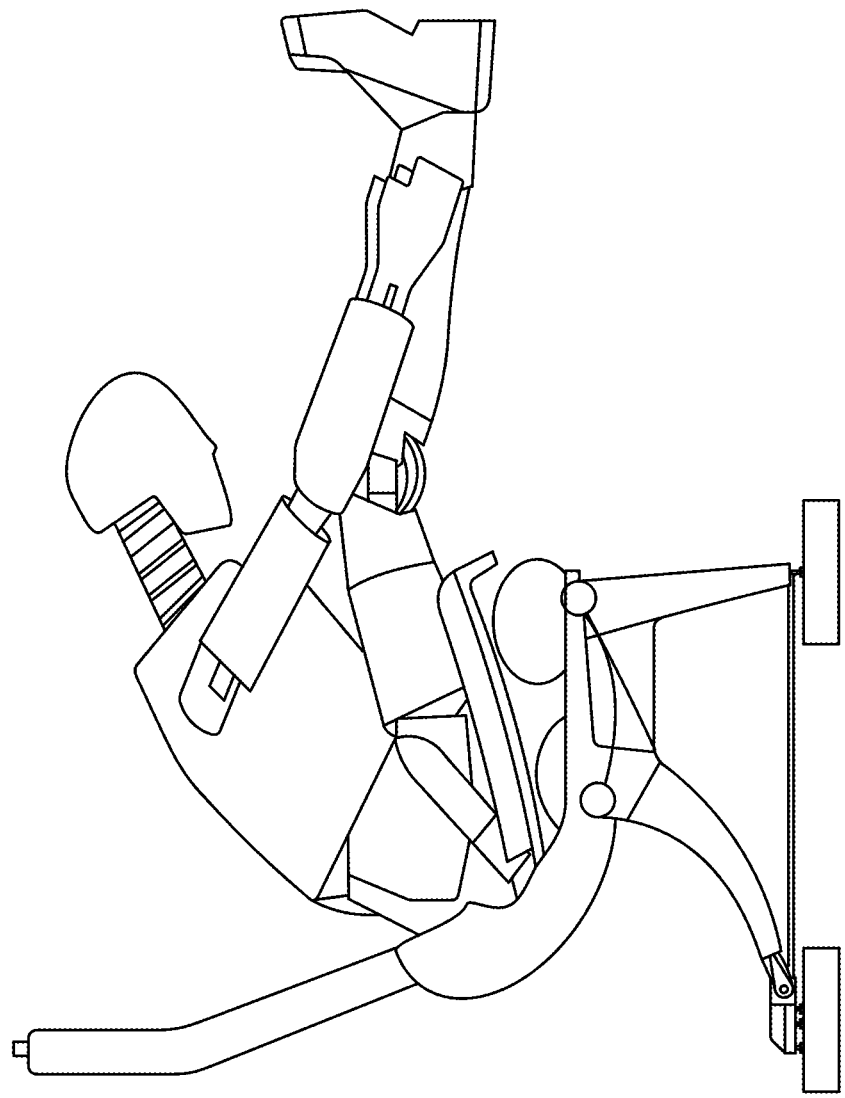
Figure 23:
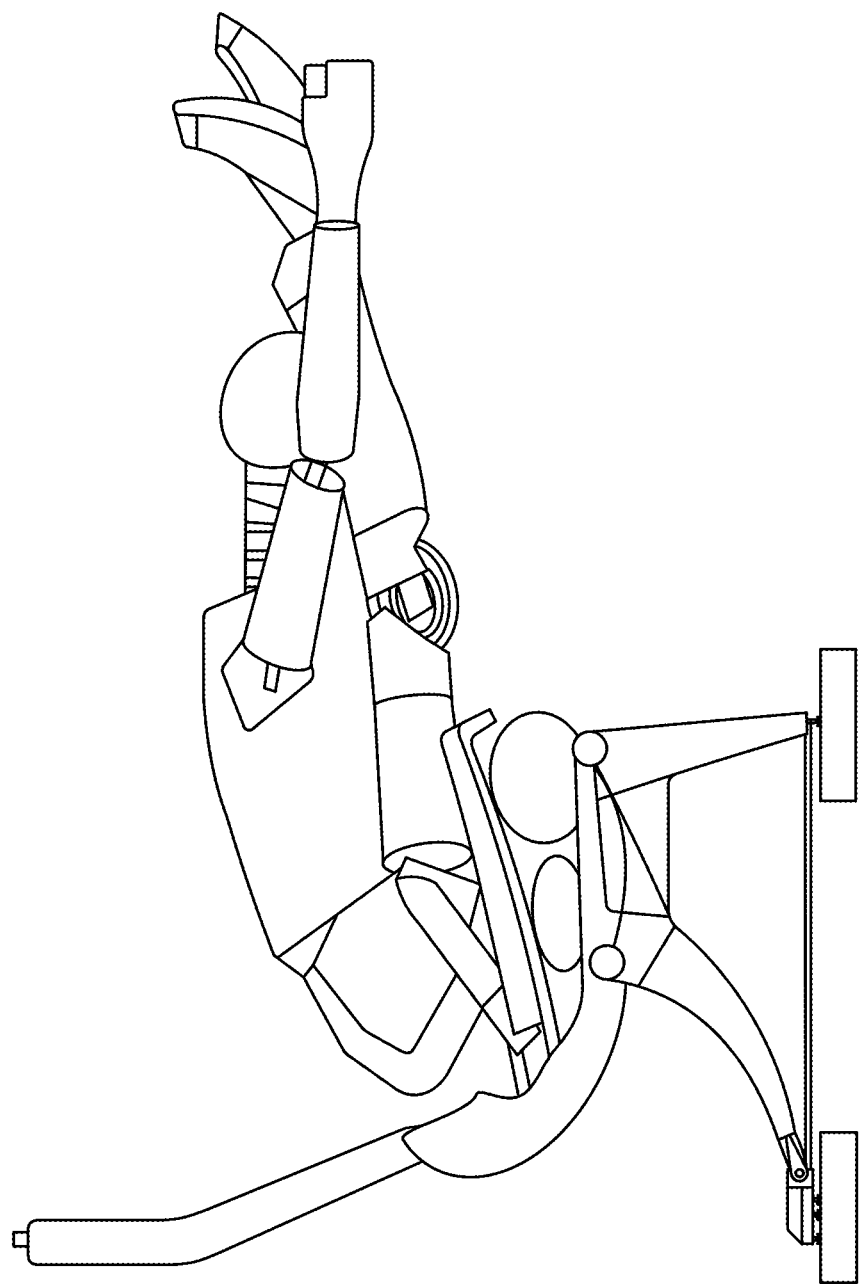

The difference between the embodiment of FIG. 20 and the embodiment illustrated in FIG. 13 is that the multiple airbag apparatus of FIG. 20 is implemented in tandem with a restraining apparatus 2020 at the rear of the seat cushion. The result of restraining the seat cushion in this manner is that the degree of lift is somewhat reduced. FIG. 21 shows the test dummy 150 at t1; FIG. 22 shows the test dummy 150 at t2; and FIG. 23 shows the test dummy 150 at t3.

Figure 24:
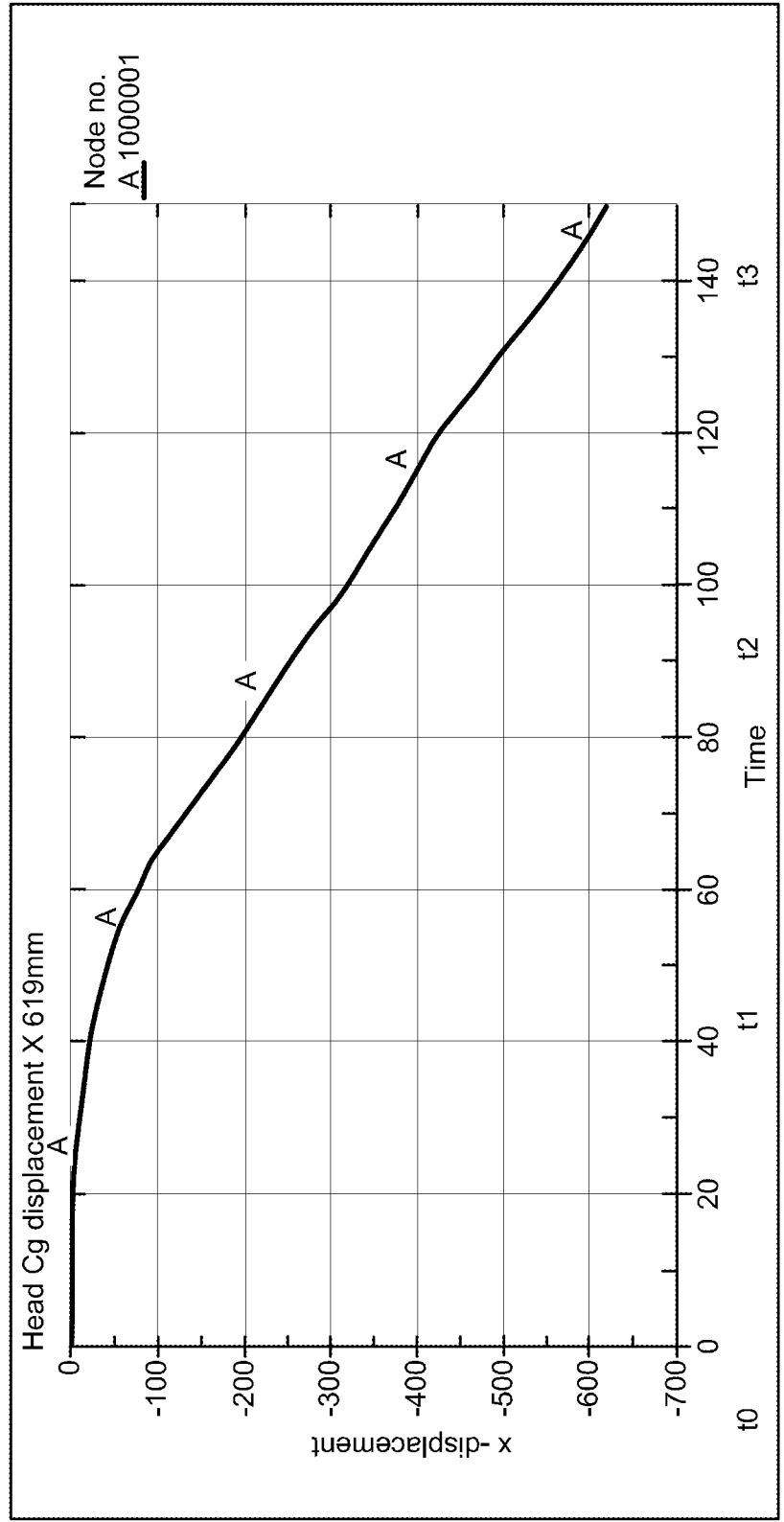
FIG. 24 is a graph illustrating head path excursion of the test dummy of FIG. 20 along the x-axis during the crash event.
Figure 25:
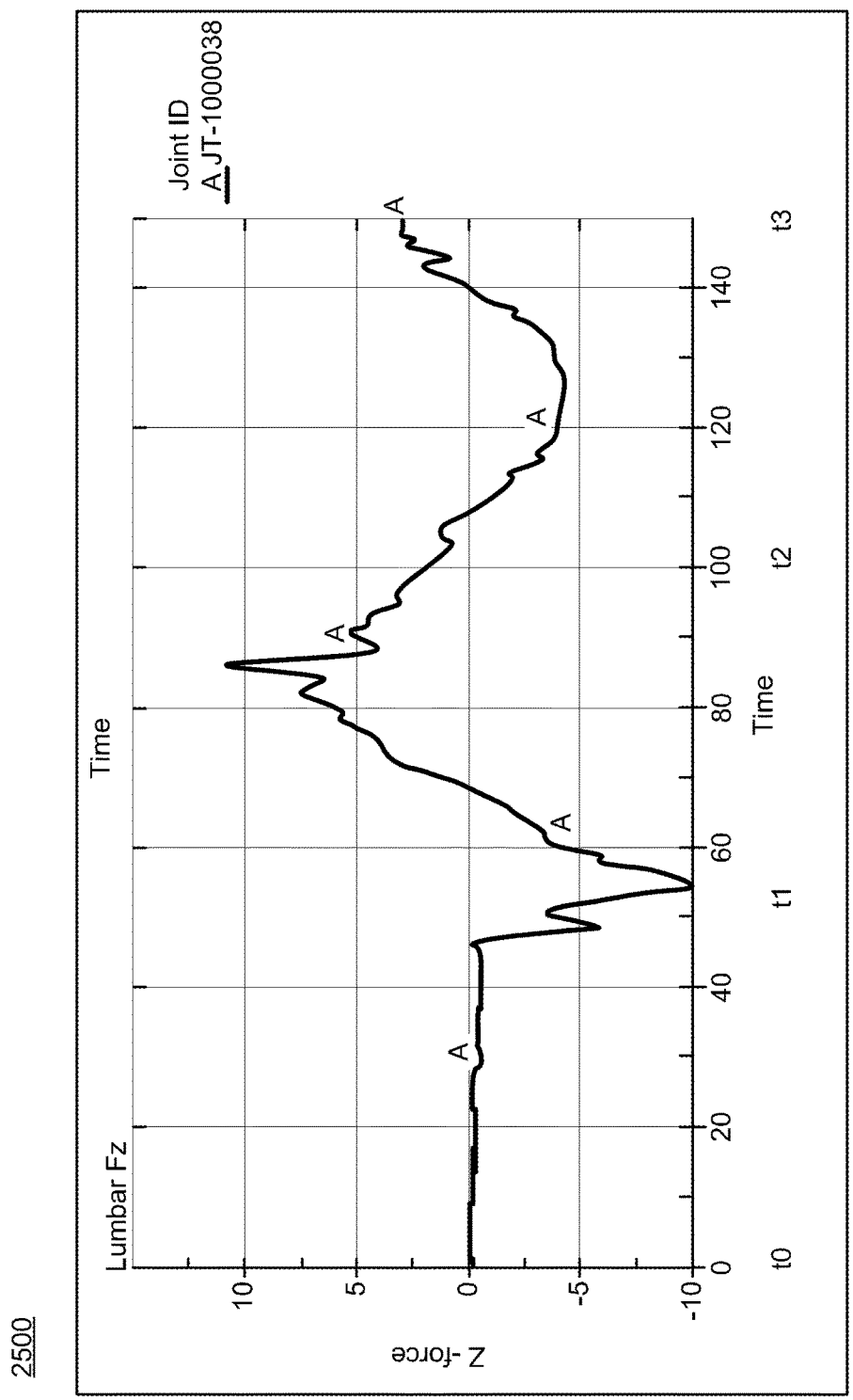
FIG. 25 is a graph illustrating the z-axis displacement of the lumbar region of the test dummy of FIG. 20 during the crash event.

FIG. 24 is an x-axis displacement chart 2400 of the path of travel of the test dummy's head (head path excursion) during the crash event shown in FIG. 20 through FIG. 23, showing a displacement of 619 mm. FIG. 25 is a z-force chart 2500 of the z-axis displacement of the test dummy's lumbar area during the crash event shown in FIG. 20 through FIG. 23. The lift assemblies that are discussed herein do not preclude the installation of additional airbags, such as in a dashboard or bulkhead of airplane.

Figure 26:
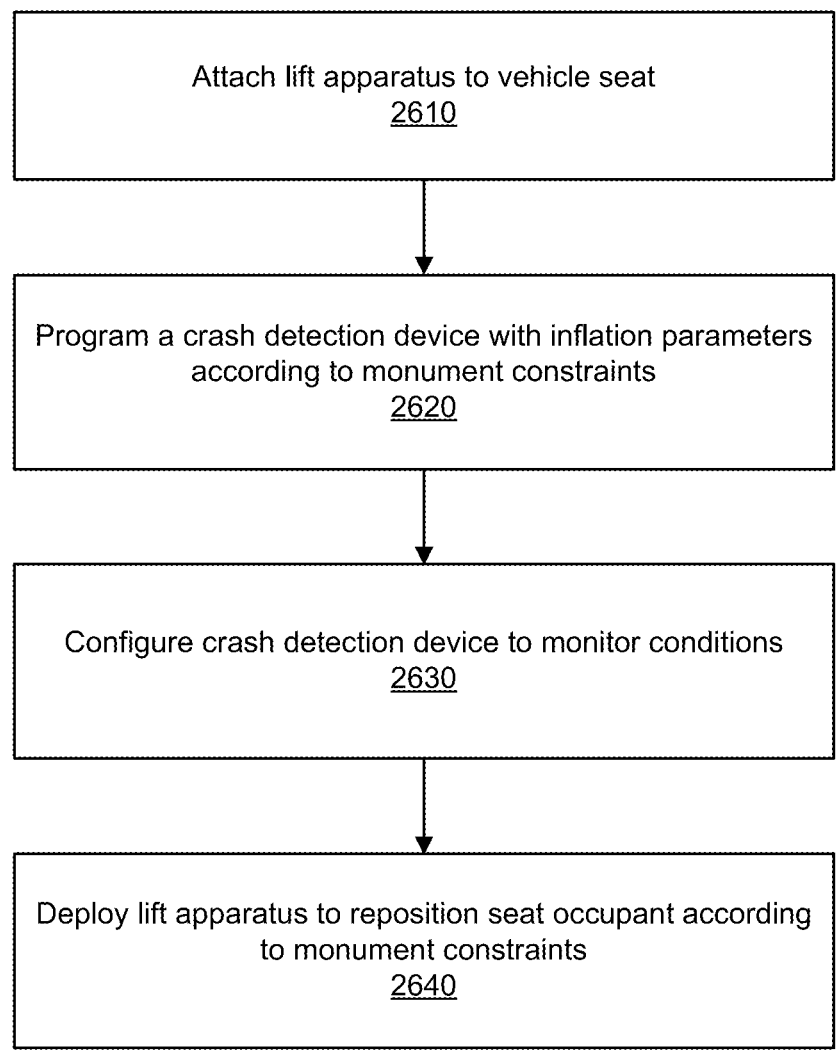
FIG. 26 is a high-level operational flow diagram of a method for repositioning an occupant during a crash event.

FIG. 26 is a high-level operational flow diagram of a method for repositioning an occupant during a crash event, according to an embodiment. The method can include the steps of: attaching a lift apparatus such as an airbag and/or mechanical lift to a vehicle seat 2610; programming a crash detection device with inflation parameters according to monument constraints 2620; configuring the crash detection device to monitor conditions 2630; and deploying the lift apparatus to reposition a seated occupant in a crash event 2640.

Figure 27:
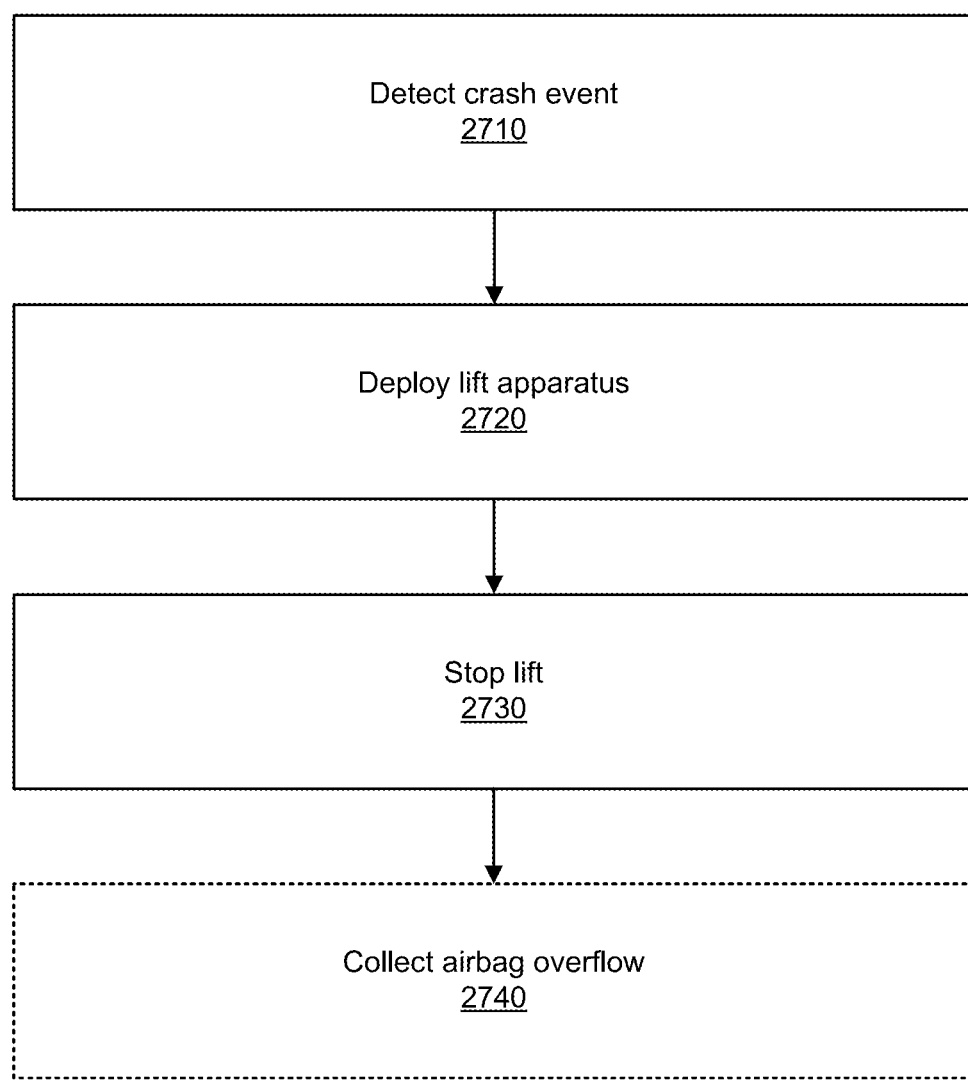
FIG. 27 is an operational flow diagram of the method of FIG. 28 as performed by a repositioning apparatus.

FIG. 27 is a high-level operational flow diagram of a method for repositioning an occupant during a crash event, according to an embodiment. In step 2710, the crash detection device detects a crash event. Responsive to detecting the crash event, in step 2720 the lift apparatus, such as the multiple airbag system 1310, is deployed to reposition the occupant according to the parameters provided. The repositioning step can include deploying the airbags 1310 in sequence, or deploying the airbags 1310 at the same time. The rate, sequence, and timing of deployment can be adjusted. In step 2730 the lift process is halted and the occupant seat returns to its initial state before the crash event. Optional step 2740 is directed to embodiments using a bladder 1110 to collect airbag overflow.

Figure 28:
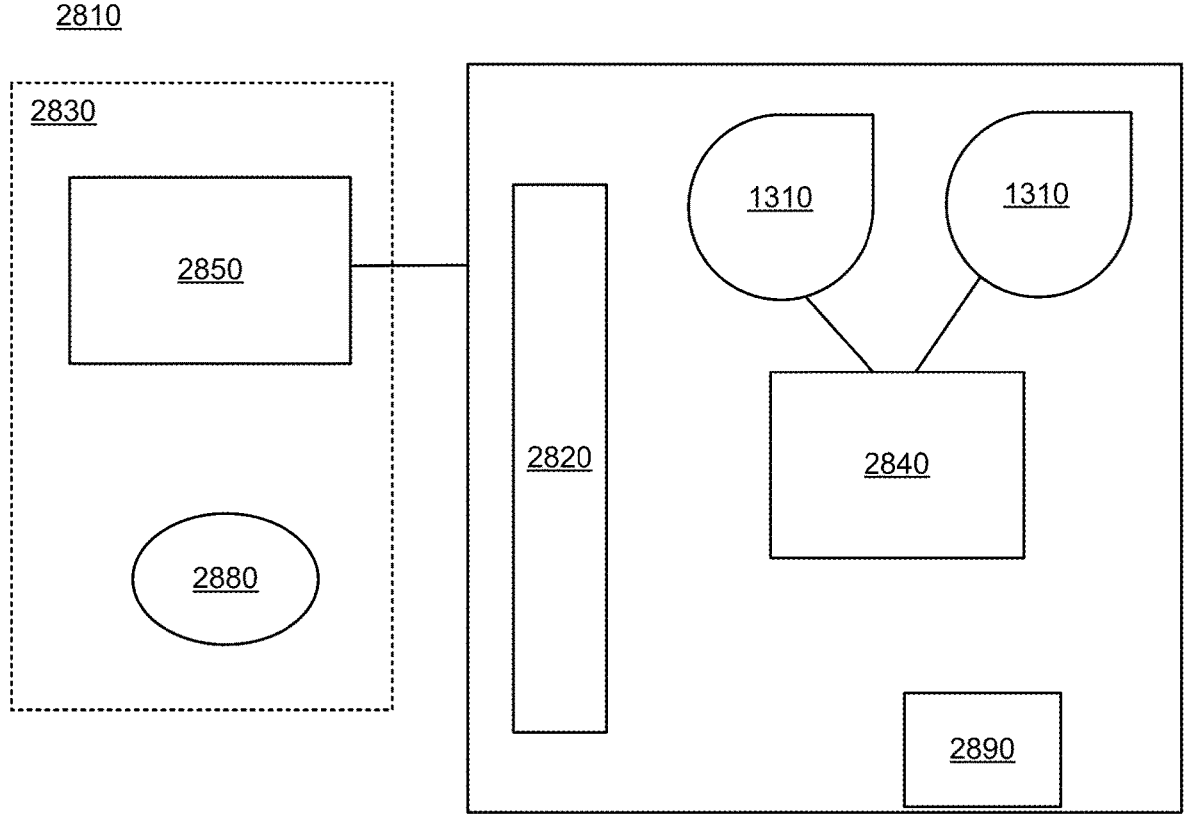
FIG. 28 is a simplified block diagram of the components of a multi-airbag system.

FIG. 28 is a simplified block diagram of the components of a multi-airbag system 2810, according to one embodiment. The components of a multi-airbag system 2810 can include, inter alia: programmable controller 2850, sensor assembly 2880, power supply 2890, airbag actuation assembly 2820, inflator assembly 2840, and airbags 1310. Programmable controller 3050 and sensor assembly 2880 make up the crash detection device 2830. Programmable controller 2850 can be any programmable device, locally or remotely located, operable to receive and evaluate data from the sensor assembly 2880 and possibly external warning systems such as a Transponder Collision Avoidance System (TCAS).

Sensor assembly 2880 can include at least one accelerometer and can communicate directly with the airbag actuation assembly 2820 to trigger inflation of the airbags 1310 via the inflator assembly 3040. In another embodiment, the sensor assembly 2880 communicates with the programmable controller 2850 which in turn activates the airbag actuation assembly 2820. The inflator assembly 2840 can include a manifold inflator such as for example, a gas generator, operable to inflate multiple airbags 1310 or individual inflators, one per airbag 1310. Airbags 1310 are constructed of a flexible material such as nylon and are stowed in a deflated state which can include a folded condition. The airbags 1310 can be of different sizes and shapes, with inflated diameters of, for example, four to ten inches.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. In particular, features from one embodiment can be used with another embodiment. The embodiments were chosen and described to best explain the principles of the disclosure and the practical application, and to enable others of ordinary skill in the art to understand the invention for various embodiments with various modifications as are suited to the particular use contemplated.

I claim:

1. An airbag system for repositioning a seat occupant in a moving vehicle during a potentially injurious event, the airbag system comprising:
    a first inflatable airbag in a normally deflated state disposed proximate to a front portion of a seat pan;
    a second inflatable airbag in the normally deflated state disposed proximate to a rear portion of the seat pan; and
    an inflation control device controlling deployment of the first and second inflatable airbags, the inflation control device operatively communicative with the first and second inflatable airbags, the inflation control device comprising:
    a programmable controller controlling inflation parameters of the first and second inflatable airbags to achieve a desired lift, subject to monument constraints; and
    a plurality of inflation devices, each one configured to inflate each one of the first inflatable airbag and the second inflatable airbag, each of the plurality of inflation devices performing:
    receiving a signal from a sensor device indicating detection of the potentially injurious event comprising an acceleration/deceleration above a pre-defined magnitude of force; and
    responsive to receiving the signal, deploying its connected airbag to an inflated state, thereby repositioning the seat occupant by upwardly raising the seat occupant to a pre-specified height;
    wherein the first and second inflatable airbags are deployed independently in a timed sequence with the second inflatable airbag being deployed before the first inflatable airbag, thereby lifting the seat occupant's torso before lifting the seat occupant's knees.

2. The airbag system of claim 1 wherein the first and second inflatable airbags are disposed between the seat pan and a seat cushion in direct contact with the seat occupant.

3. The airbag system of claim 1 wherein the first and second inflatable airbags are disposed between the seat pan and a seat frame.

4. The airbag system of claim 1 further comprising a mechanical lift operatively communicative with the inflation control device, the mechanical lift actuated by the inflation control device to exert an upwards force on the seat pan during the deployment of the first and second inflatable airbags.

5. The airbag system of claim 1 further comprising a bladder coupled with at least one of the first and second inflatable airbags to collect gaseous overflow upon deployment of the at least one of the first and second inflatable airbags.

6. The airbag system of claim 1 further comprising the sensor device operable to detect and measure vehicle acceleration and deceleration.

7. The airbag system of claim 1 wherein the programmable controller adjusts the timed sequence of deployment based on the monument constraints.

8. The airbag system of claim 1 wherein the first and second inflatable airbags are housed within a seat cushion, the seat cushion comprising:
    a top surface in direct contact with the seat occupant; and
    a bottom surface proximate to the seat pan.

9. An airbag system for repositioning a seat occupant in a moving vehicle during a potentially injurious event, the airbag system comprising:
    a plurality of inflatable airbags in a normally deflated state disposed proximate to a seat pan; and an inflation control device controlling deployment of the plurality of inflatable airbags, the inflation control device comprising:

a manifold having an inlet and a plurality of outlets, where each one of the plurality of outlets is connected to each one of the plurality of inflatable airbags;

a programmable controller controlling inflation parameters of each of the plurality of inflatable airbags to achieve a desired lift, subject to monument constraints; and an inflation device connected to the inlet, whereupon, the inflation control device receiving a signal from a sensor device indicating detection of the potentially injurious event comprising an acceleration/deceleration above a pre-defined magnitude of force; and responsive to receiving the signal, activating the inflation device, thereby repositioning the seat occupant by upwardly raising the seat occupant to a pre-specified height;

wherein each of the plurality of inflatable airbags are deployed independently in a timed sequence configured by the manifold, thereby lifting the seat occupant's torso before lifting the seat occupant's knees.

10. The airbag system of claim 9 wherein the plurality of inflatable airbags are disposed between the seat pan and a seat cushion in direct contact with the seat occupant.

11. The airbag system of claim 9 wherein the plurality of inflatable airbags are disposed between the seat pan and a seat frame.

12. The airbag system of claim 9 further comprising a mechanical lift operatively communicative with the inflation control device, the mechanical lift actuated by the inflation control device to exert an upwards force on the seat pan during the deployment of the plurality of inflatable airbags.

13. The airbag system of claim 9 further comprising a bladder coupled with at least one of the plurality of inflatable airbags to collect gaseous overflow upon deployment of the at least one of the plurality of inflatable airbags.

14. The airbag system of claim 9 further comprising the sensor device operable to detect and measure vehicle acceleration and deceleration.

15. The airbag system of claim 9 wherein the programmable controller adjusts the timed sequence of deployment based on the monument constraints.

16. The airbag system of claim 9 wherein the plurality of inflatable airbags are housed within a seat cushion, the seat cushion comprising:

a top surface in direct contact with the seat occupant; and a bottom surface proximate to the seat pan.

* * * * *